United States Patent
Farmanyan

(10) Patent No.: US 9,464,929 B2
(45) Date of Patent: Oct. 11, 2016

(54) LIQUID LEVEL TRANSDUCER WITH PIVOTING AND LINEAR MOTION

(71) Applicant: Texas LFP, LLC, Dallas, TX (US)

(72) Inventor: Gagik Farmanyan, Plano, TX (US)

(73) Assignee: Texas LFP, LLC, Dallas, TX (US)

( * ) Notice: Subject to any disclaimer, the term of this patent is extended or adjusted under 35 U.S.C. 154(b) by 114 days.

(21) Appl. No.: 14/614,397

(22) Filed: Feb. 4, 2015

(65) Prior Publication Data

US 2016/0123788 A1    May 5, 2016

Related U.S. Application Data

(60) Provisional application No. 62/073,699, filed on Oct. 31, 2014.

(51) Int. Cl.
  *G01F 23/32* (2006.01)
  *G01F 23/38* (2006.01)
  *G01F 23/36* (2006.01)

(52) U.S. Cl.
  CPC ............... *G01F 23/32* (2013.01); *G01F 23/38* (2013.01); *G01F 23/36* (2013.01)

(58) Field of Classification Search
  CPC ........ G01F 23/32; G01F 23/34; G01F 23/36; G01F 23/363; G01F 23/38
  USPC ............................................ 73/305–308, 317
  See application file for complete search history.

(56) References Cited

U.S. PATENT DOCUMENTS

| 3,240,388 A * | 3/1966 | Brainard | B60K 15/061 222/51 |
| 6,209,392 B1 * | 4/2001 | Rapala | G01F 23/36 338/33 |
| 2013/0180328 A1 * | 7/2013 | Farmanyan | G01F 23/36 73/313 |

FOREIGN PATENT DOCUMENTS

| DE | 102010019397 A1 * | 11/2011 | ............ G01D 5/251 |
| GB | 2245973 A * | 1/1992 | ........... G01F 23/366 |

* cited by examiner

*Primary Examiner* — Peter Macchiarolo
*Assistant Examiner* — Nathaniel Kolb
(74) *Attorney, Agent, or Firm* — Alvin R. Wirthlin

(57) ABSTRACT

A liquid level transducer includes a mounting head for connection to the wall of a tank and a housing extending into the tank from the mounting head. A float rod is pivotally connected to the housing and a float is connected to the float rod for pivotal movement upon a change of liquid level in the tank. A proximal end of the float rod is connected to an actuator portion and constrained for pivotal movement about two parallel axes so that the actuator portion moves in a linear direction with respect to the housing. The interior of the housing includes a sensor assembly responsive to the linear movement of the actuator portion to thereby determine the level of liquid within the tank.

16 Claims, 18 Drawing Sheets

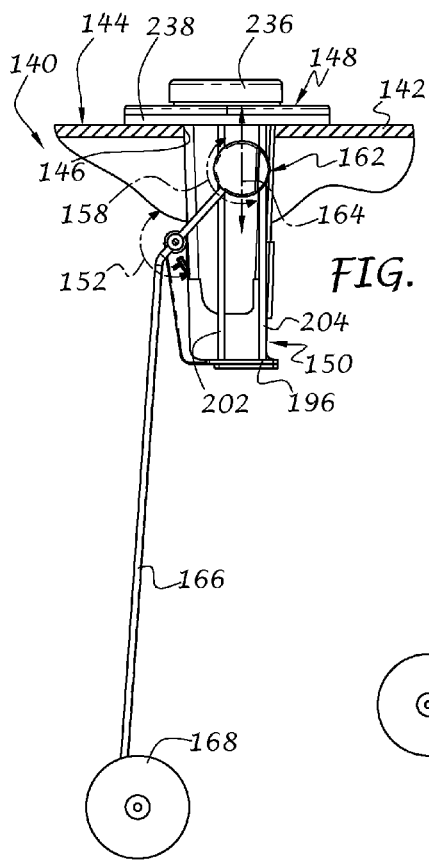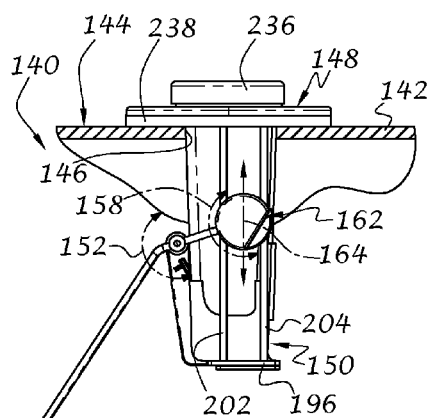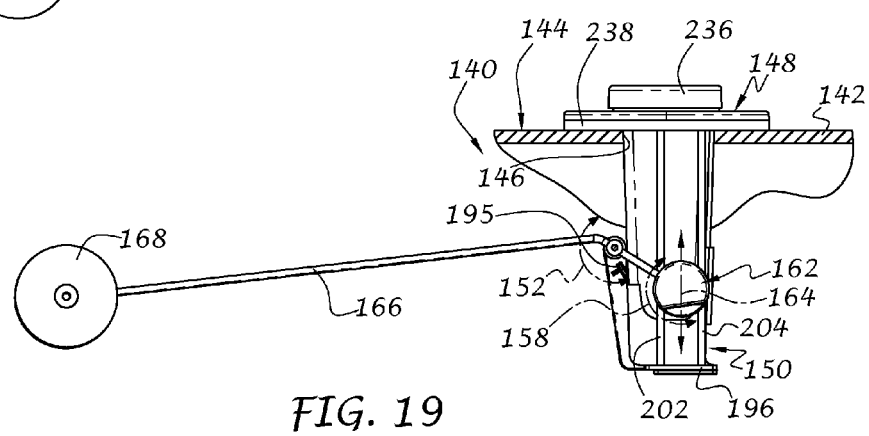
FIG. 17
FIG. 18
FIG. 19

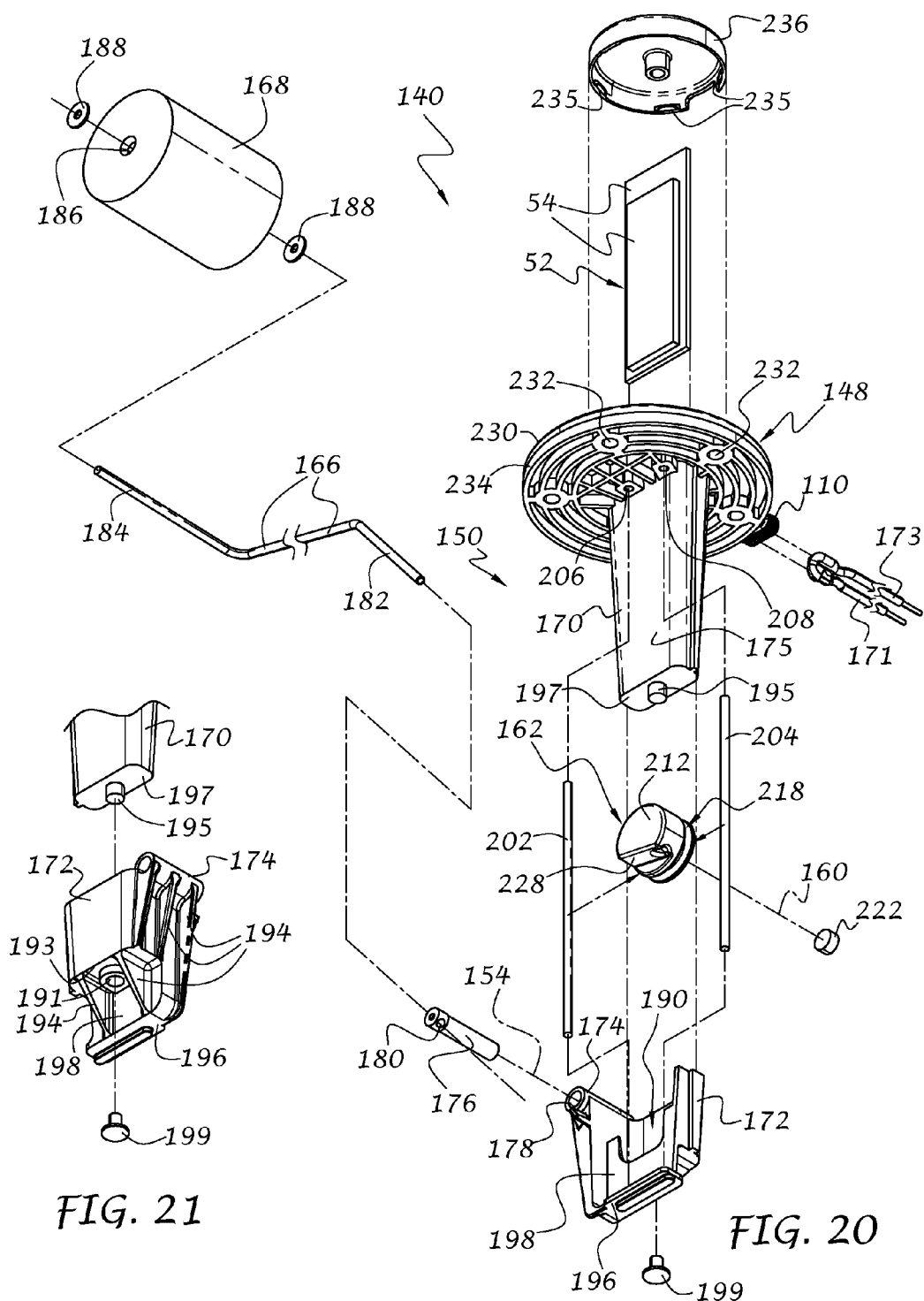

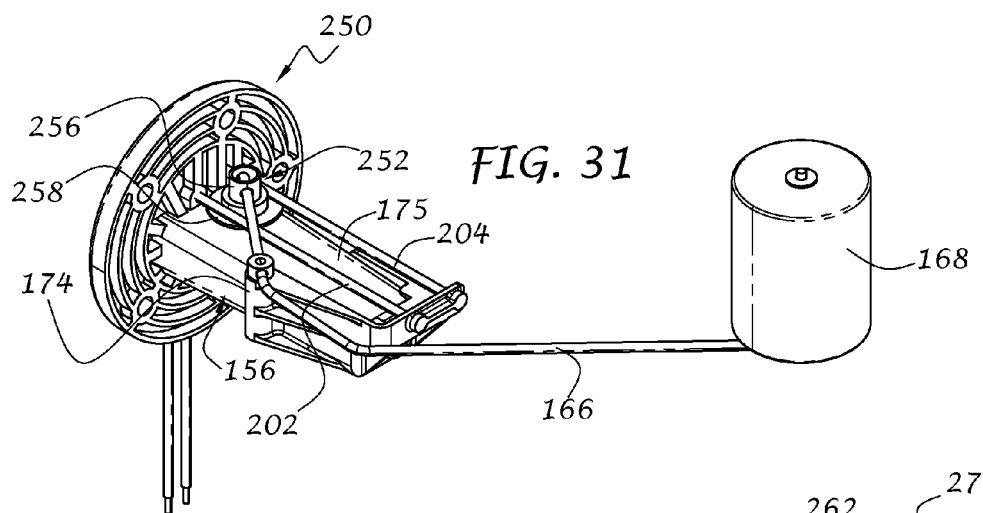
FIG. 31
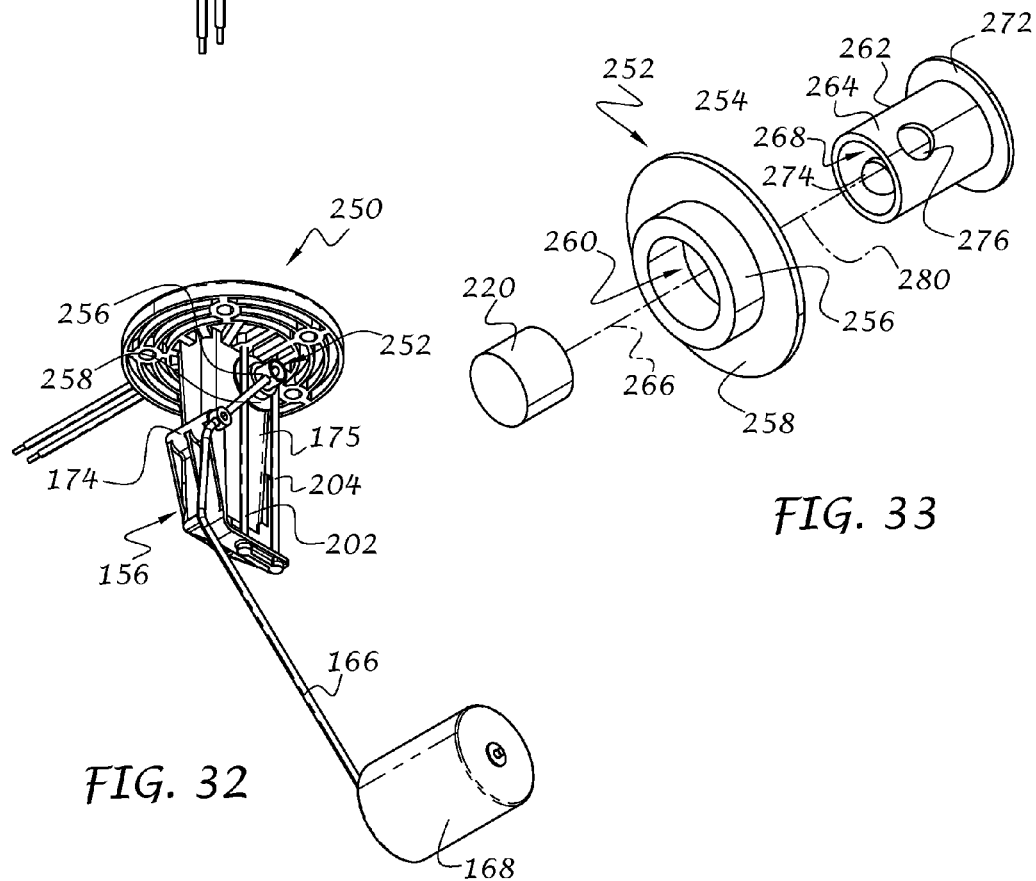
FIG. 33
FIG. 32

LIQUID LEVEL TRANSDUCER WITH PIVOTING AND LINEAR MOTION

CROSS-REFERENCE TO RELATED APPLICATIONS

This application claims the benefit of U.S. Provisional Application No. 62/073,699 filed on Oct. 31, 2014.

BACKGROUND OF THE INVENTION

This invention relates to liquid level transducers, and more particularly to a liquid level transducer having a float that moves in response to a change in liquid level.

Transducers for measuring liquid level are often used in vehicles, industrial equipment, as well as other mobile and stationary systems and components. The electrical output of such transducers varies in response to a change in the liquid level being measured and is typically in the form of a change in resistance, capacitance, current flow, magnetic field, and frequency. These types of transducers may include variable capacitors or resistors, optical components, Hall effect sensors, strain gauges, ultrasonic devices, reed switch arrays, and so on.

For reed switch-type devices, a plurality of reed switches are usually arranged in series with a plurality of resistors along the length of a circuit board. The reed switches are normally responsive to the presence and absence of a magnetic field for opening and/or closing the switch. A float rides along the surface of the liquid to be measured and is constrained to move in a linear direction along the circuit board. The float usually includes an embedded magnet to trip one of the reed switches as the float moves in response to a change in liquid level in the tank. Thus, the resistance of the circuit, which is indicative of liquid level, depends on the position of the float and the particular reed switch that has been tripped.

However, such devices typically have several drawbacks. For example, it is known that reed switches suffer from hysteresis effects and may open and/or close prematurely depending on the orientation of the reed switches with respect to the magnet, the magnetic strength of the magnet, the distance between the reed switch and the magnet, and so on. When the reed switches are aligned linearly, each reed switch may open and close up to three times as the float approaches, aligns with, and passes each reed switch, thus leading to improper liquid level indication, undesired switching, and premature failure of the switches. In addition, prior art solutions expose the reed switches to the liquid being measured, which may be corrosive and cause inaccurate liquid level readings and premature failure. It would therefore be desirable to overcome at least some of the disadvantages associated with prior art reed switch-type liquid level transducers.

In addition, prior art liquid level transducers that include a mounting head and an elongate sensor probe, such as a reed switch probe, resistor probe, capacitor probe, and so on, are often difficult and time-consuming to assemble due to the number of individual components and the fastening means associated with each component. It would therefore be desirable to provide a liquid level transducer that is easier to assemble and has relatively fewer parts.

Moreover, prior art liquid level transducers having a float rod that pivots in response to a change of liquid level within a tank suffer from a very limited range of movement, and thus the sensing range as well as the number of sensors, such as reed switches, that can be practically positioned along the range of movement. Accordingly, the measuring resolution can be greatly compromised. In addition, these types of liquid level transducers have limited range of movement due to volume constraints with the tank as well as space constraints of the transducer housing in light of the relatively small opening in the tank for receiving the transducer and other components that may be associated therewith, such as liquid withdrawal and return tubes, pumps, electronics, filters, and so on, that may be associated with various requirements of a tank installations on motorized vehicles or equipment. or stationary structures. associated with installing the liquid level transducer through a relatively small opening in the tank and limitations rotational movement of the float and float arm with respect to the transducer housing.

SUMMARY OF THE INVENTION

In accordance with one aspect of the invention, a transducer for determining the level of liquid within a container comprises a mounting head adapted for connection to the container; a housing extending from the mounting head and having a hollow interior isolated from liquid within the container; and an actuator portion. The actuator portion includes an actuator body connected to the housing that is restrained to travel in a linear direction with respect to the housing. An actuator is connected to the actuator body for movement therewith. A first pivot axis is operably associated with one of the housing and the actuator portion. At least one sensor is located in the hollow interior. The at least one sensor changes in electrical state in response to external input from the actuator. A float rod has a proximal end operably associated with the actuator portion for movement therewith along the linear direction. The float rod is constrained to pivot about the first pivot axis. A float is connected to the float rod to thereby cause pivoting movement of the float rod about the first axis and linear movement of the actuator portion in response to a change in liquid level within the container to thereby change the electrical state of the at least one sensor proportional to the level of liquid within the container.

Other aspects of the invention will become evident upon considering the following detailed description of the preferred embodiments of the invention in conjunction with the accompanying drawings.

BRIEF DESCRIPTION OF THE DRAWINGS

The following detailed description of the preferred embodiments of the present invention will be best understood when considered in conjunction with the accompanying drawings, wherein like designations denote like elements throughout the drawings, and wherein:

FIGS. 17-19 are right side elevational views of the liquid level transducer of FIG. 12 illustrating the sequence of pivoting movement of the float translated to sliding movement of the actuator between the distal and proximal positions thereof over an approximate float range of movement, reflecting the liquid level within a tank between empty and full;

FIG. 20 is a right-rear bottom isometric exploded view of the liquid level transducer of FIG. 12;

FIG. 21 is a left-rear bottom isometric exploded view of a portion of the liquid level transducer of FIG. 12 showing connection of first and second housing sections in accordance with the invention;

FIG. 31 is a right-front bottom isometric view of a liquid level transducer in accordance with yet another embodiment of the invention oriented for mounting on a tank in a horizontal position;

FIG. 32 is a similar view thereof with the liquid level transducer oriented for mounting on a tank in a vertical position; and FIG. 33 is an enlarged exploded view of an actuator portion associated with the liquid level transducer of the FIGS. 31 and 32 embodiment.

Figure 1:
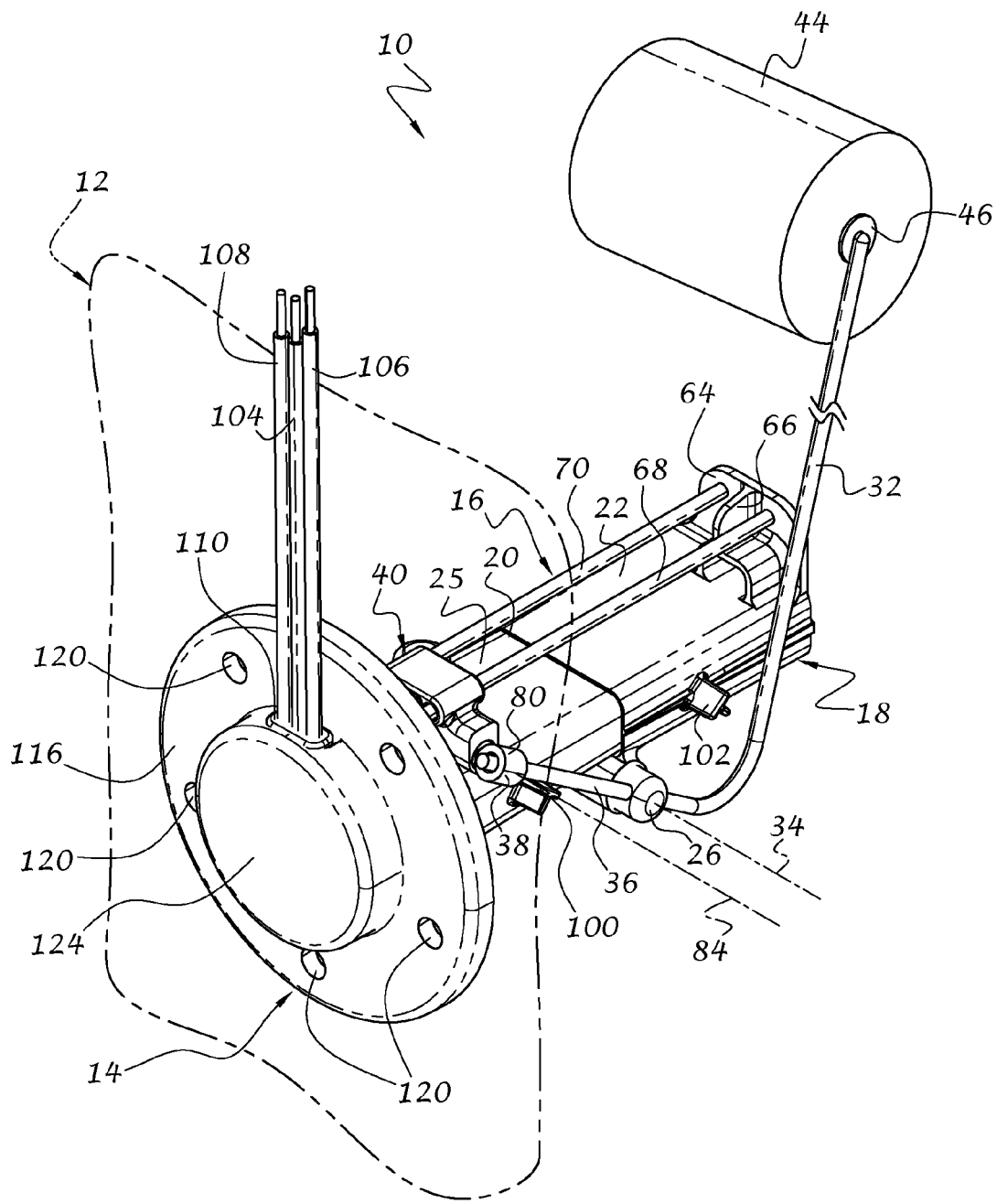
FIG. 1 is a right side top isometric view of a liquid level transducer in accordance an exemplary embodiment of the invention with the pivoting float and actuator portion in a first or proximal position with respect to a mounting head that forms part of the liquid level transducer.

It is noted that the drawings are intended to depict only exemplary embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Referring now to the drawings, and to FIGS. 1-6 in particular, a liquid level transducer 10 in accordance with an exemplary embodiment of the present invention is illustrated. The liquid level transducer 10 preferably extends into a container 12 (shown in phantom line in FIG. 1), such as a fuel tank, oil reservoir, radiator, brake fluid chamber, or any other container for holding and/or transporting a liquid (not shown) where it is desirous to determine the level of liquid within the container. The transducer 10 preferably includes a mounting head 14 for connection to the container 12 and a sensor assembly 16 extending therefrom. Although the transducer 10 is shown in many of the drawings as being oriented in a horizontal direction, it will be understood that the transducer 10 can be mounted for extending in a vertical direction or any other suitable angle or orientation, without departing from the spirit and scope of the invention, such angle or orientation being dependent at least partially upon space constraints as dictated by the structure of the vehicle, machine, etc., with respect to the container 12 and/or the particular shape of the container 12.

Figure 4:
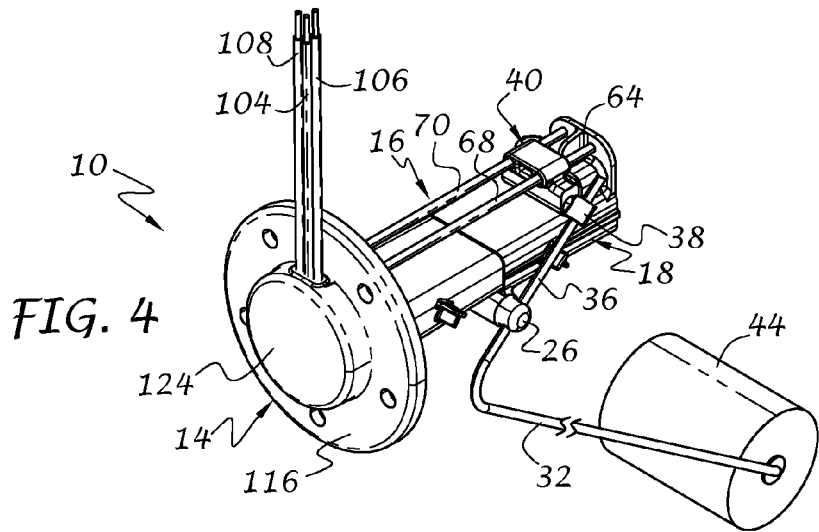
FIGS. 4-6 are views similar to FIGS. 3 to 1, respectively, illustrating the sequence of pivoting movement of the float translated to sliding movement of the actuator between the distal and proximal positions thereof over the float range of movement, reflecting the liquid level within a tank between empty and full.
Figure 5:
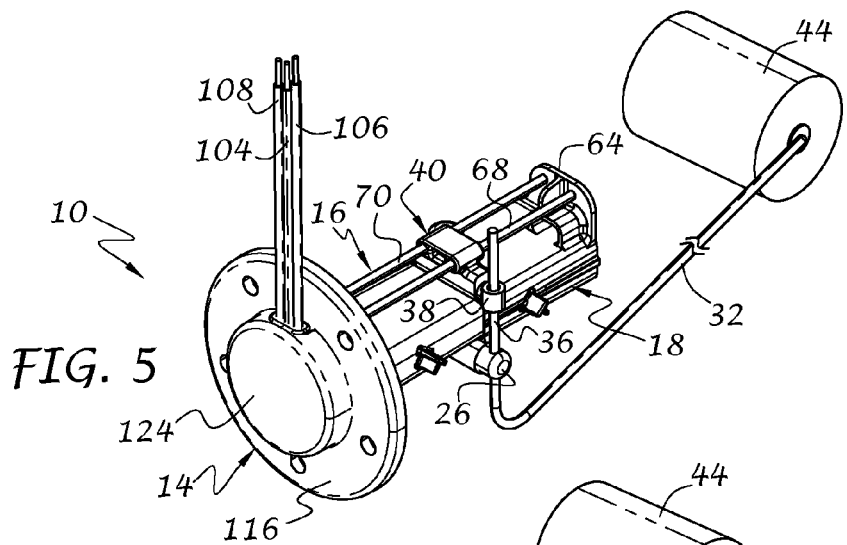
Figure 6:
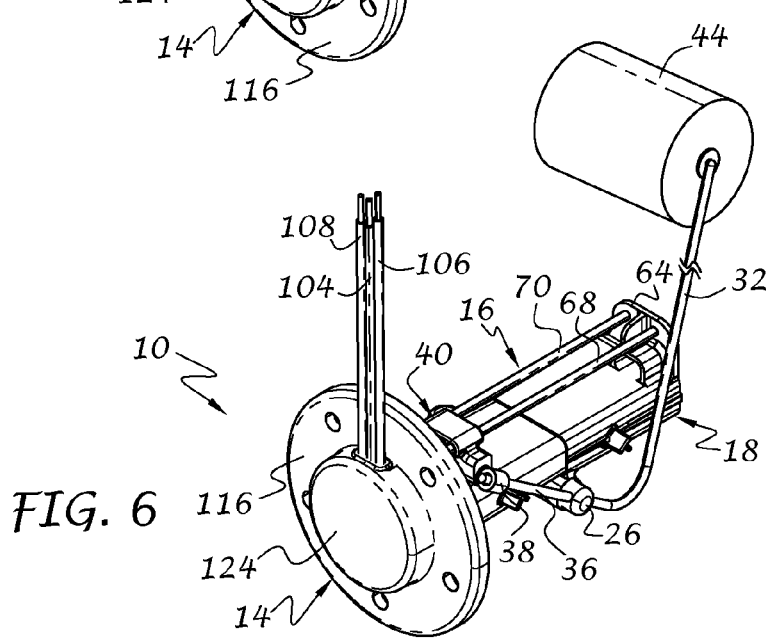

As best shown in FIGS. 4-6, the sensor assembly 16 preferably senses liquid by translating arcuate sliding motion of a float 44 and float rod 32 with respect to a sensor housing 18 as the liquid rises and falls within the container, and translates the arcuate sliding motion into linear movement along a length of the housing 18, so that a significant increase in measurement range and/or resolution can be realized without the significantly increasing the size of the sensor assembly.

With this feature in mind, and referring now to FIGS. 1-3, 7, and 9, the sensor assembly 16 preferably includes the housing 18 with a first housing section 20 that is preferably integrally formed with the mounting head 14 and a second housing section 22 that extends from the first housing section 20. The first and second housing sections are preferably constructed of a plastic material that is chemically resistant to the liquid being measured.

In accordance with a further embodiment of the invention, the housing 18 can be separated from the mounting head 14 by a variable length support, such as by support rails (not shown) that extend from the mounting head and through supporting structure (not shown) in the housing 18 so that the housing 18 can slide with respect to the mounting head and thus be adjustable in length for accommodating different space constraints and sizes of containers. Where it is desirous to keep the interior of the housing 18 sealed from the contents of the tank, a flexible membrane complementary in shape with both the housing and mounting head can be connected therebetween. Moreover, in accordance with yet a further embodiment of the invention, the housing 18 can be formed of multiple sections sealingly connectable together so that a desired housing length can be formed. Thus, it will be understood that the housing 18 can be a fixed size or adjustable in length and/or distance with respect to the mounting head to accommodate a wide variety of tank configurations and sizes.

A first pivot mount 24 is integrally formed or otherwise connected to the second housing section 22 and is in the form of an elongate, tubular member that extends transverse to a sensor wall 25 of the first housing section 20 when connected thereto. The sensor wall 25 extends between a movable actuator portion 40 and an electronic sensor unit 52 located within a hollow interior 50 of the first housing section 20. A first pivot pin 26 extends through a bore 23 of the first pivot mount 24 and is pivotally secured thereto via a push-nut or washer 28 that is press-fit over one end of the pivot pin 26 after installation in the pivot mount 24 within the bore 23. It will be understood that the push-nut or washer can be eliminated and other means used for pivotally securing the first pivot pin 26 to the first pivot mount 24 can be used. An opening 30 is formed in the opposite end of the first pivot pin 26 and is sized to slidably receive a float rod 32 so that the float rod both slides through the first pivot pin 26 and rotates about a first pivot axis 34 coincident with a central axis of the first pivot mount 24 during float movement, such as when the level of liquid within the container changes, and thus the height of the float with respect to the container.

The float rod 32 has a proximal end 36 slidably connected to a second pivot pin 38 associated with an actuator portion 40 and a distal end 42 that receives a float 44. The float 44 is connected to the distal end 42 of the float rod 32 via a central bore 45 formed in the float in a conventional manner, with bearing washers 46 positioned on either side of the float 44 and a push nut or washer 48 pressed onto the distal end 42 of the float rod 32. As shown, the float rod 32 can be bent to accommodate the float rod mounting and the configuration of a particular tank or container. However, it will be understood that the float rod can be straight or configured in any desired shape to accommodate different containers and liquid level measurement configurations.

The first housing section 20 is preferably of unitary construction with the mounting head 14 so that the hollow interior 50 of the first housing section 20 is isolated from the liquid in the tank or container being measured. However, it will be understood that the mounting head 14 and first housing section 20 can be separately formed and connected together without departing from the spirit and scope of the invention. The electronic sensor unit 52, including one or more sensing and processing circuit board(s) 54, one or more sensors 56 (FIG. 10), and/or one or more sensors 58 (shown in phantom line in FIG. 10), and suitable processing circuitry (not shown) are located in the hollow interior 50 and are also isolated from the contents of the tank.

As shown, the first housing section tapers inwardly and away from the mounting head 14 and is received in a similarly shaped hollow interior 60 of the second housing section 22. Due to the unitary construction of the housing section 20, the hollow interior 50 and its contents, including the electronic sensor unit 52, are completely isolated from the liquid being measured to advantageously increase the measurement reliability of the transducer 10 and extend its useful life over prior art arrangements where measurement components are directly exposed to the liquid being measured. Since many liquids are corrosive in nature and could cause deterioration of the measurement components and their electrical connections in prior art solutions, isolation of the sensor unit 52 in accordance with the present invention prevents deterioration of both the measurement components as well as their electrical connections, thereby providing a liquid level transducer 10 that is more robust, reliable, and longer lasting than prior art solutions.

Reinforcing ribs 62 (FIG. 7) are preferably formed on one side of the second housing section 22. As best shown in FIG. 8, a support ledge or platform 64 is formed on an opposite side of the second housing section 22 and may include reinforcing ribs 66 to add structural support to the ledge 64.

Guide members, shown by way of example as guide rods or rails 68, 70 preferably extend between the ledge 64 of the second housing section 22 and rod support structure 73 (FIG. 11) formed with the mounting head 14. The guide rods are preferably cylindrical in shape and are operable to guide linear movement of the actuator portion 40 during use. Although two guide rods are shown, it will be understood that a single guide rod, or more than two guide rods, may be provided without departing from the spirit and scope of the invention. Moreover, in accordance with a further embodiment of the invention, one or more guide rods or rails can be formed integrally with the housing 18 and/or the mounting head 14. The guide rods can also be of any suitable cross sectional shape, such as T-shaped, L-shaped, oval, square, rectangular, triangular (dovetail-shaped), and so on.

The actuator portion 40 preferably includes an actuator body 72 with a second pivot mount 74 that is integrally formed or otherwise connected to the body 72 and is in the form of an elongate, tubular member. The second pivot pin 38 extends through a bore 76 of the second pivot mount 74 and is pivotally secured thereto via a push nut or the line (not shown) that is pressed over one end of the second pivot pin 38 after installation in the pivot mount 24 within the bore 23. A split sleeve or collar 78 can also be installed in the bore 76 and surround the second pivot pin 38 to ensure smooth rotational movement of the second pivot pin 38 with respect to the second pivot mount 74. The second pivot pin 38 preferably includes an enlarged head 80 with an opening 82 extending therethrough and is sized to slidably receive the proximal end 36 of the float rod 32 so that the proximal end 36 of the float rod rotates about a second pivot axis 84 coincident with a central axis of the second pivot mount 74 and parallel with the first pivot axis 34, and also slides through the opening 82 during pivoting movement of the float, when the liquid level within the container changes height.

The actuator portion 40 also includes guide bores 86 and 88 formed in the body 72 that extend perpendicular to the pivot axis 84. Each guide bore 86, 88 is preferably sized and complementary shaped to slidably receive one of the guide rods 68, 70 so that the actuator portion 40 moves linearly along the guide rods with respect to the housing 18, as represented by opposing arrows 85 and 87 in FIG. 11, in response to pivotal and sliding movement of the float rod 32. It will be understood that where only one guide rod is provided, as previously described, the actuator portion 40 can have a single guide bore or more than one guide bore in series coincident with the same axis. It will be further understood that the guide bores may include linear guide bearings or the like or be constructed of a bearing material, such as nylon or brass for example, in order to ensure smooth movement of the actuator portion 40 with respect to the guide rod(s). It will be further understood that where the guide rod(s) have a particular cross-section, the guide bore (s) can also be complementary in cross sectional shape or of a cross sectional shape that would be suitable for the guide rod. By way of example, for a guide rod with a T-shaped cross section, the guide bore can also be an open T-shaped slot. As a further example, when the guide rod is dovetail-shaped, the guide bore can also be dovetail-shaped for receiving the guide rod. Thus, a wide variety of different guide rod and guide bore configurations are within the purview of the present invention.

Figure 7:
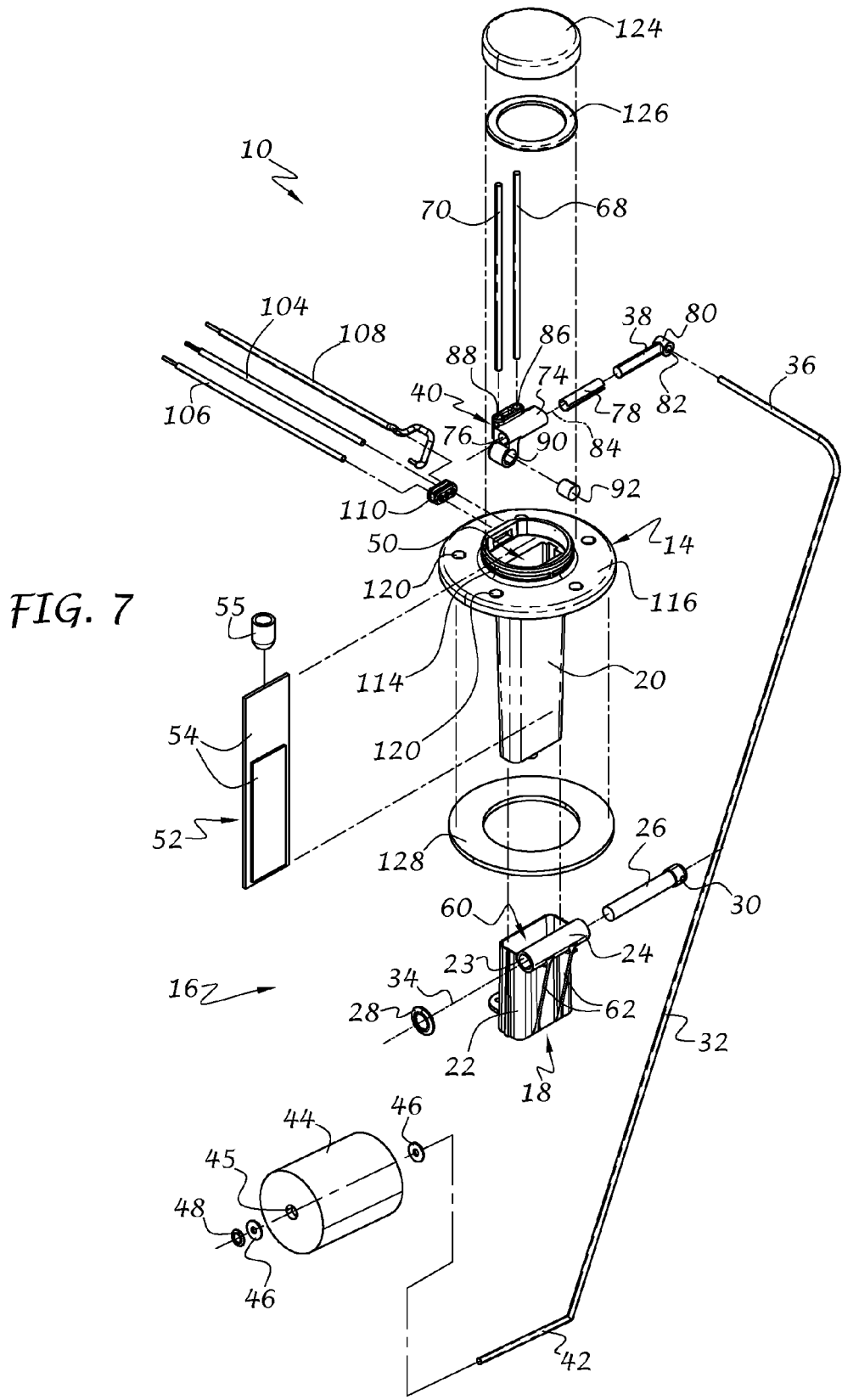
FIG. 7 is a left side isometric exploded view of the liquid level transducer of FIG. 1.
Figure 8:
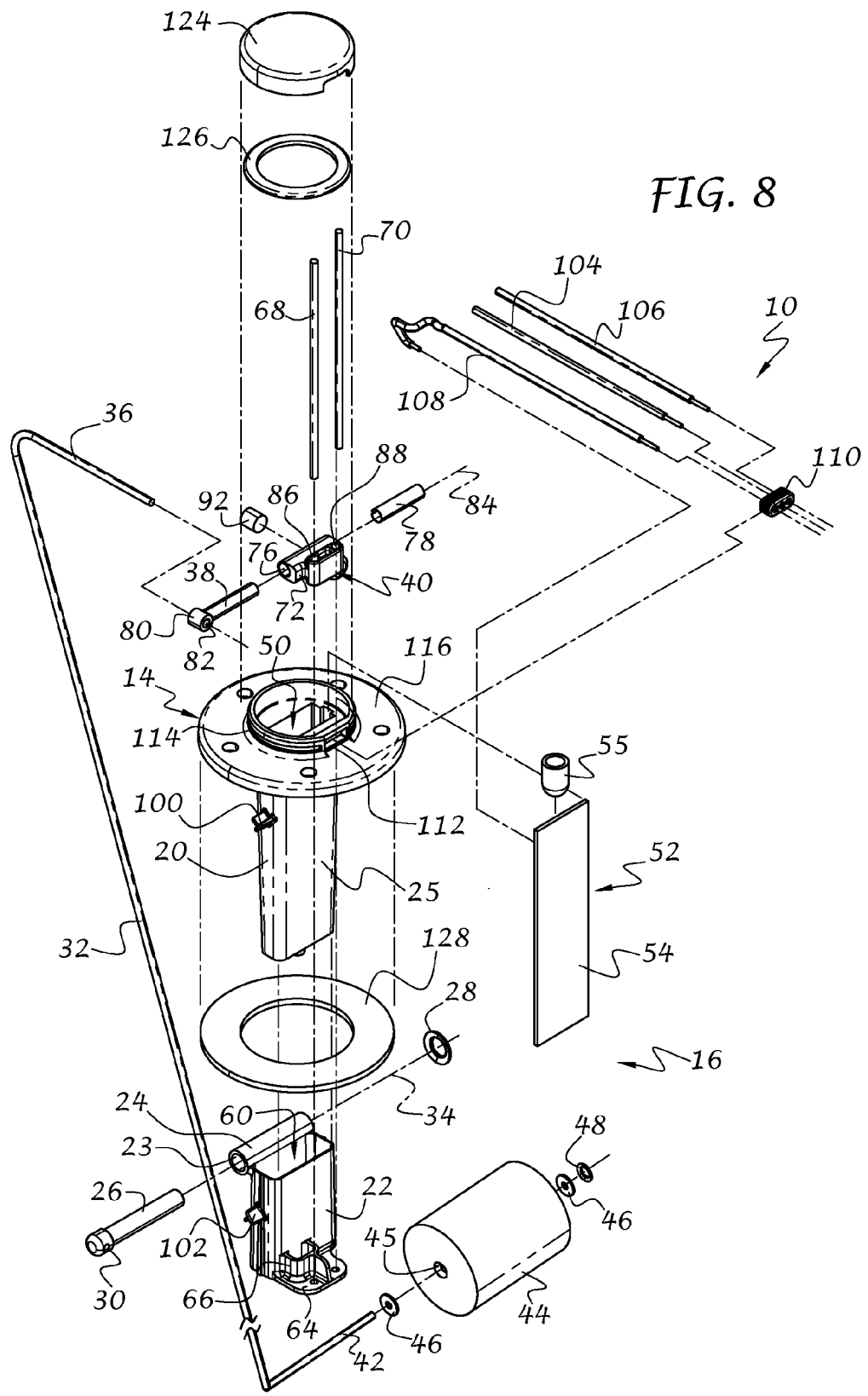
FIG. 8 is a right side isometric exploded view thereof.
Figure 10:
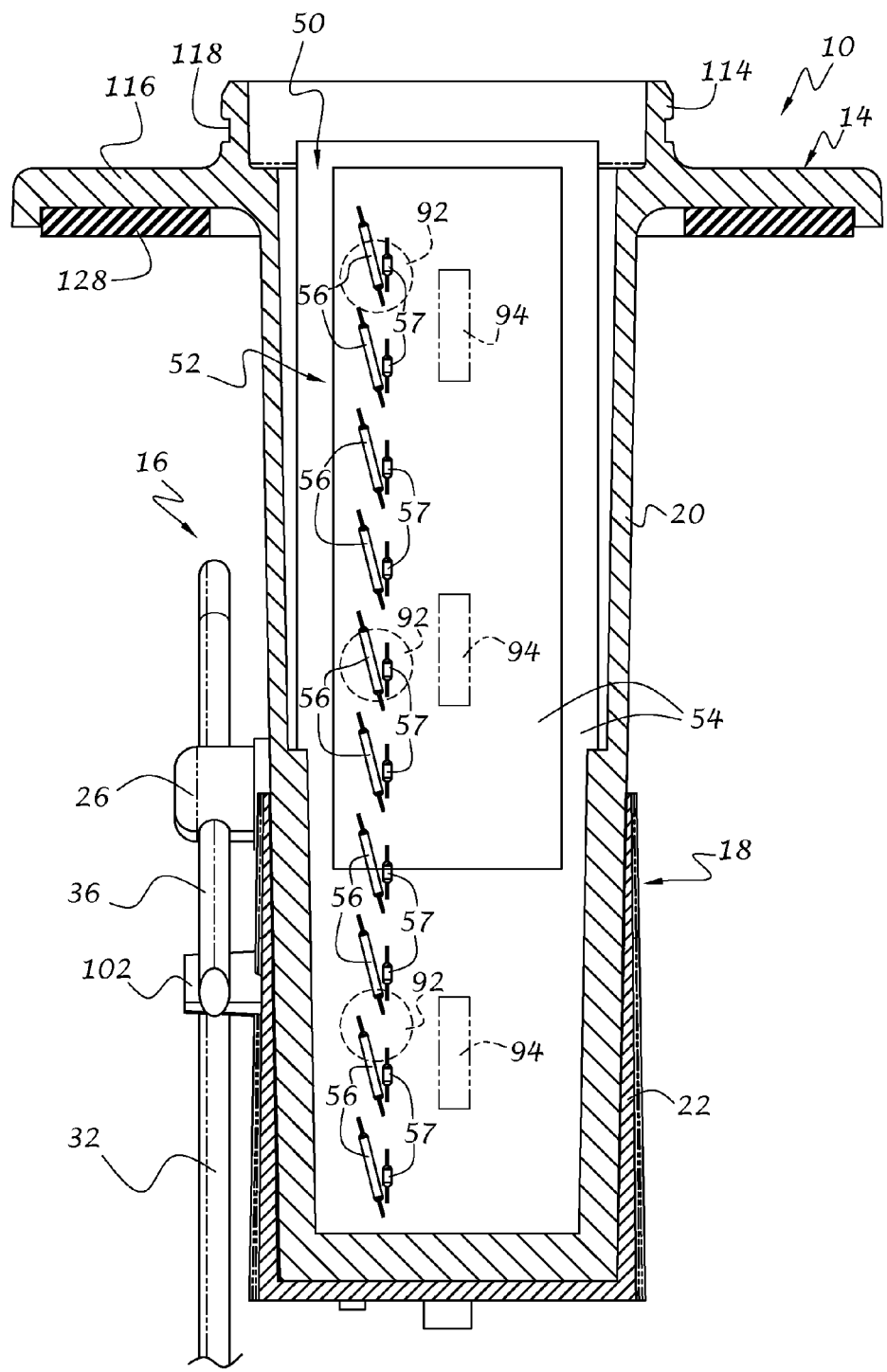
FIG. 10 is a sectional view thereof taken along line 10-10 of FIG. 9.
Figure 11:
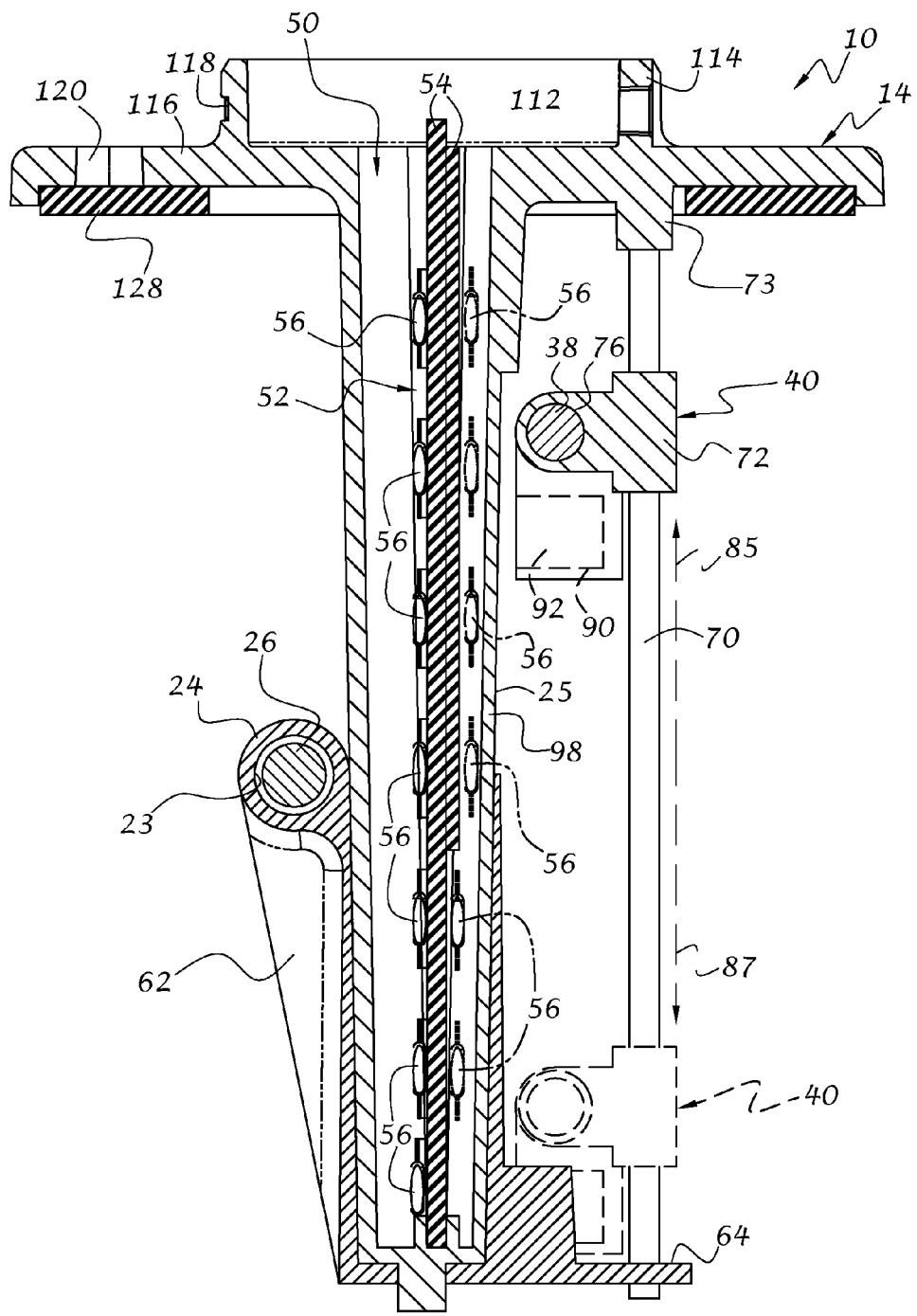
FIG. 11 is a sectional view thereof taken along line 11-11 of FIG. 9.

As best shown in FIGS. 7 and 11, a cylindrical pocket or depression 90 (shown in hidden line) is formed in the body 72 of the actuator portion 40 for receiving a cylindrically-shaped actuator 92 that also moves linearly with the actuator portion 40 and changes one or more states of the sensors 56 and/or 58. Preferably, the sensors 56 comprise reed switches in series with resistors 57 (FIG. 10) that change state between open and closed positions depending on the location of the actuator 92 with respect to the sensors 56 (see the dashed circles in FIG. 10 that represent different positions of the actuator 92 along the length of the sensor board(s) 54). To that end, the actuator 92 preferably comprises a permanent magnet that changes the state of the reed switches and causes a voltage change in the circuitry depending on the location of the actuator and which reed switch(es) is/are actuated, as is well known.

In accordance with a further embodiment of the invention, the sensors 94 (in phantom line in FIG. 10) represent one or more Hall-effect sensors or similar devices that measure the strength of a magnetic field generated by the permanent magnet 92 as the magnet travels towards and away from one or more of the sensors 58.

As best shown in FIGS. 10 and 11, the sensor board 54 is preferably in the form of one or more printed circuit boards (PCB), located in the hollow interior or pocket 50 of the first housing section 20. The PCB preferably extends along a substantial height and width of the interior pocket 50. A grommet or retainer 55 (FIG. 8) is connected to a proximal end of the PCB for retaining the PCB in a centered position within the interior pocket 50 when the transducer 10 is assembled. Although the PCB is shown extending a substantial length or height of the hollow interior 50 to take full advantage of the entire linear travel of the actuator portion 40, the PCB, as well as the first housing section 20, can be shorter than the length of linear travel when the entire travel is not needed, such as when the arcuate movement of the float between full and empty conditions does not require the entire travel length of the actuator portion 40. The plurality of sensor elements 56, preferably in the form of normally-open reed switches 56, (or one or more Hall-effect sensors 58) are mounted on the PCB 54 and can be connected in series with the plurality of resistors 57 in a well-known manner. The reed switches 56 are preferably oriented in a linear pattern along the length of the PCB so that linear movement of the magnetic actuator 92 is coincident with the linear array of reed switches 56 and/or Hall-effect sensor(s) in response to rotational movement of the float 44. Preferably, the reed switches 56 are positioned parallel to a mounting flange 116 of the mounting head 14 and parallel to each other, as shown in FIG. 10, in order to position a greater number of reed switches 56 into a relatively small housing, thereby increasing resolution of the liquid level transducer 10.

Figure 2:
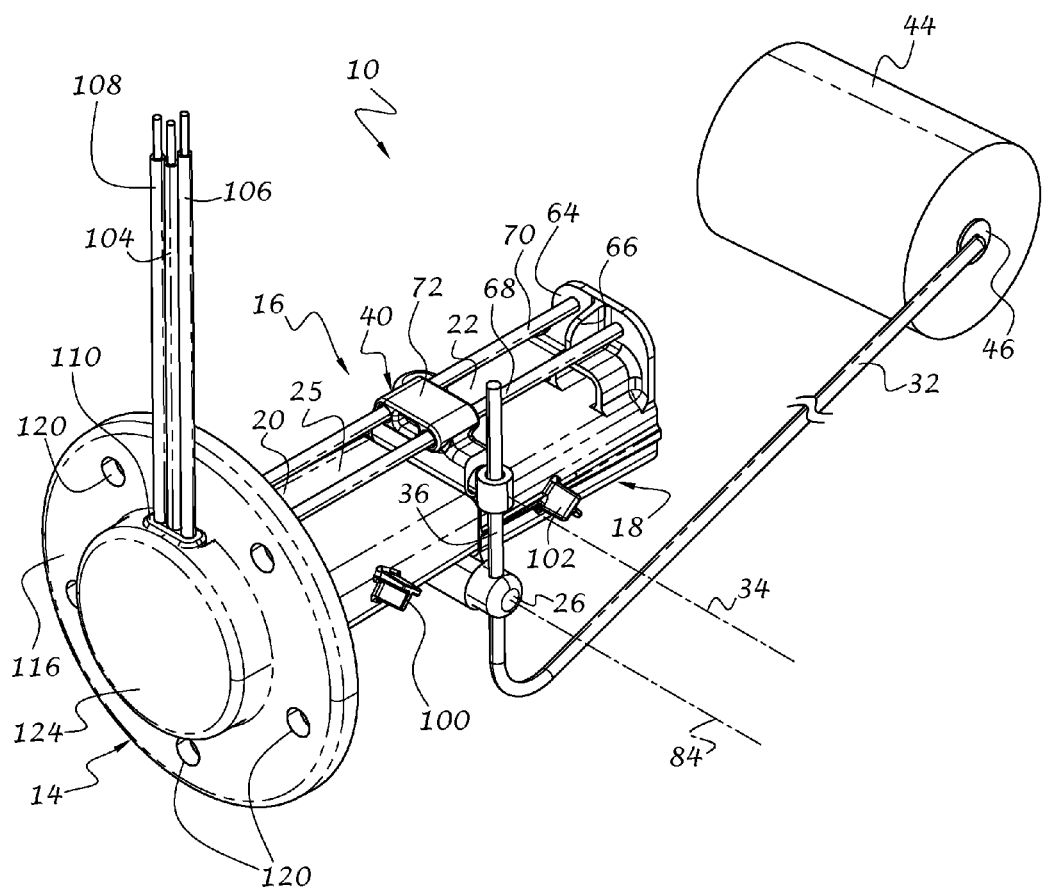
FIG. 2 is a view similar to FIG. 1 with the pivoting float and actuator portion in a second or intermediate position with respect to the mounting head.
Figure 3:
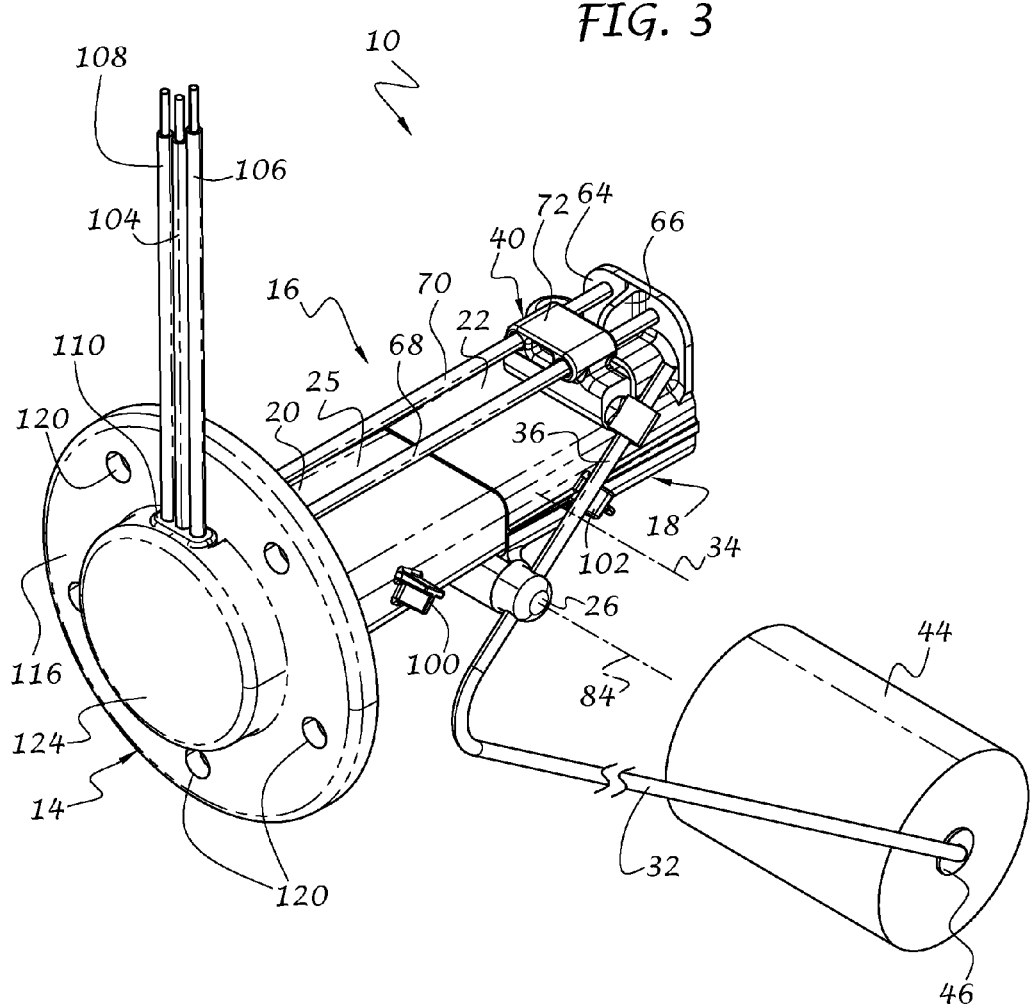
FIG. 3 is a view similar to FIG. 1 with the pivoting float and actuator portion in a third or distal position with respect to the mounting head.

The reed switches 56 are responsive to the magnetic field generated by the magnetic actuator 92, which passes through the side wall 98 of the first housing section 20 as the magnet travels along the linear pathway in response to float movement due to a change in the level of liquid within the container. When a magnetic field is present on one of the reed switches 56, the reed switch closes and, in conjunction with its associated resistor 57, creates a liquid level signal. As the magnet travels away from the reed switch, it will return to its normally open position and another reed switch will close under the magnetic field. In this manner, liquid level sensing can advantageously occur without exposing the reed switches to the liquid being measured to thereby advantageously increase the measurement reliability of the transducer 10 and extend its useful life over prior art arrangements. As best shown in FIG. 2, a first stop 100 is formed on the first housing section 20 and a second stop 102 is formed on the second housing section to limit rotational movement of the float arm 32, and thus the linear travel of the actuator portion 40 under full tank and empty tank conditions.

It will be understood that normally closed reed switches can be used without departing from the spirit and scope of the invention. It will be further understood that the reed switches or other sensors can be located on either side of the PCB without departing from the spirit and scope of the invention, as the magnetic field can be made sufficiently strong to pass through the housing wall(s), the PCB, and any potting material contained within the pocket 50.

Moreover, in accordance with a further aspect of the invention, reed switches 56 can be located on opposite sides of the PCB in a staggered relationship to thereby increase the number of sensors and thus the measuring resolution of the liquid level transducer 10.

Although not shown, insulating material, such as potting material, and so on, can be located in the pocket 50, surrounding the PCB, reed switches, and other components to insulate and protect the components against shock, vibration, and other harsh conditions to which the transducer 10 may be exposed.

Although a particular number of reed switches are shown, it will be understood that more or less reed switches can be provided without departing from the spirit and scope of the invention. Electrical wires 104, 106, and 108 (best shown in FIGS. 7 and 8) preferably extend from the sensor board 54 and through a strain relief or grommet 110 located in an opening 112 of an annular side wall 114 of the mounting head 14. Alternatively, in accordance with a further aspect of the invention, the grommet 110 can be in the form of an electrical connector or plug for receiving a complementary connector or plug associated with further processing and/or display circuitry (not shown) of the vehicle or other device with which the container is associated. Moreover, the grommet 110 can be used for sealing only, and a separate strain relief provided inside the mounting head 14. Where an electrical connector or plug is used, or depending on the particular structure of the mounting head 14 and the manner in which the electrical wires are connected to the PCB, the grommet and/or strain relief can be eliminated.

In addition, although reed switches have been described with respect to this embodiment, it will be understood that other magnetic sensing devices can be used without departing from the spirit and scope of the invention. For example, other devices can include, but are not limited to, one or more solid state magnetic flux field sensors, the afore-mentioned Hall effect sensors, magnetoresistive (MR) sensors, anisotropic MR (AMR) sensors, giant magnetoresistance (GMR) sensors, solid state Micro-Electro-Mechanical Systems (MEMS), magnetic switches, as well as nonmagnetic sensing technologies such as proximity detectors using capacitance, optical, or other measurement technologies, and so on. With the use of the above sensors, it may not be necessary to have the sensor in alignment with the linear pathway of the magnet, or a plurality of sensors, since a single Hall effect IC may be sufficient to determine the position of the magnet and thus the level of liquid within the container. In addition, the actuator need not be cylindrical in shape as shown, but may be of other suitable shapes such as rectangular, square, and so on.

Likewise, the actuator can be in the form of one or more magnets, LED's, optical fibers or other light source, or other contactless actuator/sensor arrangements to remotely change the electrical state of the sensor elements. In the event that optical sensors are used, the housing can be formed of a material that is translucent or transparent to the wavelength of the light source so that the sensor elements can readily detect movement of the light source as the liquid level in the container rises and falls.

Figure 9:
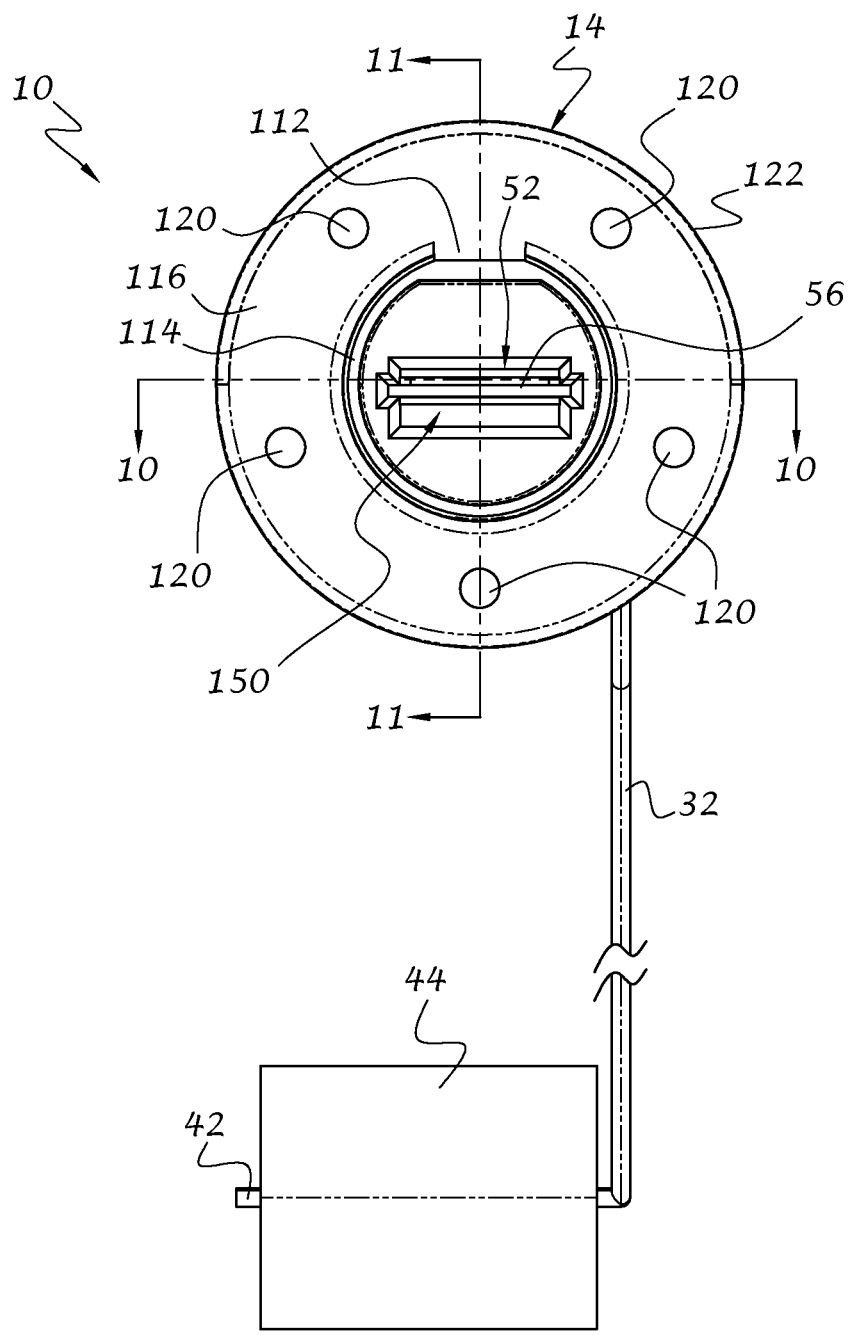
FIG. 9 is a front elevational view (or top plan view depending on the orientation) of the liquid level transducer of FIG. 1 with a top cap removed.

Referring now to FIGS. 7 to 9, the mounting head 14 preferably includes a mounting flange 116 extending radially outwardly from the annular side wall 114, and an annular groove 118 formed in the annular side wall 114. The mounting head 14 is preferably formed as a unitary structure with the first housing section 20 through injection molding, but may alternatively be formed by machining, die-casting, or other known forming means. The mounting flange 116 is preferably disk-shaped and includes a plurality of mounting holes 120 that extend axially through the mounting flange and in proximity to its outer peripheral edge 122. The mounting holes 120 are adapted to receive threaded studs (not shown) associated with a tank or other container in a well-known manner. A cover or cap 124 has an internal annular ridge (not shown) for mating with the annular groove 118 (FIG. 10) formed in the side wall 114 in a snap-fit engagement to retain the cap 124 on the mounting head 14 and enclose the hollow interior 50. An O-ring 126 or other sealing arrangement is sandwiched between the cap 124 and the side wall 114 so that the hollow interior 50 is isolated from the environment outside of the container. A gasket 128 can be provided between the mounting flange 116 and the container for sealing the opening (not shown) in the container through which the transducer 10 extends.

It will be understood that the mounting head 14 is not limited to a flange mounting arrangement as shown, other means for mounting the liquid level transducer 10 to a tank or other container can be used, including NPT type threads, clamping, welding, and so on, without departing from the spirit and scope of the invention.

The head 14 and housing sections 20, 22 are preferably constructed of a molded material, such as plastic, through injection molding or other techniques. However it will be understood that the mounting head 14 and/or the housing sections 20 and 22, are not limited to plastic material, but may be constructed of metal, composites, ceramics, combinations thereof; or any other suitable nonmagnetic material. Moreover, although the first housing section 20 and second housing section 22 of the housing 18 are shown as separate units, they can be integrally formed. In accordance with a further embodiment of the invention, the second housing section 22 can be eliminated and the first housing section either alone or together with the mounting head 14 can include all necessary structure to support the various components of the liquid level transducer 10.

In use, when the liquid level changes height in the container 12 for example, the float 44 will also change in height, causing the float rod 32 to pivot about the first pivot axis 34. Due to the linear restraint of the actuator portion 40, the float rod will also slide through the first pivot pin 26, and will also slide through the second pivot pin 38, while pivoting about the second pivot axis 84, thereby causing the actuator portion 40 to travel in a linear path along the guide rods 68, 70 connected to the housing 18 thereby causing linear translation of the magnetic actuator 92 and change the electrical state of one or more sensors indicative of the liquid level. In this manner, a larger number of sensors and/or greater measurement resolution can be obtained without significantly increasing the size of the housing when compared to prior art transducers that have a float rod with only a pivoting motion upon a change in the liquid level. In addition, a wider variety of tank sizes and shapes can be accommodated.

Referring now to FIGS. 12 to 21, a liquid level transducer 140 in accordance with a further exemplary embodiment of the present invention is illustrated. As in the previous embodiment, the liquid level transducer 140 is preferably mounted to the wall 142 (FIGS. 17 to 19) of a container 144 and extends through a hole 146 formed in the wall and into the tank for determining the level of liquid within the container.

The transducer 140 preferably includes a mounting head 148 for connection to the wall 142 of the container 144 and a sensor assembly 150 extending from the mounting head 148. Although in this embodiment the transducer 140 is shown as being oriented in a vertical direction, it will be understood that the transducer 140 can be mounted for extending in a horizontal direction or any other suitable angle or orientation, and can be adapted for use with any suitable tank or the like without departing from the spirit and scope of the invention, as discussed above with respect to the liquid level transducer 10.

As best shown in FIGS. 12 and 17-19, the sensor assembly 150 preferably senses liquid in the container 144 by translating arcuate motion (represented by arrows 152) of a float rod 166 and attached float 168 about a first axis 154 (FIG. 12) associated with a sensor housing 156 as the liquid rises and falls within the container 12, and translates the arcuate motion 152 into both rotational movement (represented by arrows 158) of an actuator portion 162 associated with the sensor assembly 150 about a second or central axis 160 (FIG. 12) of the actuator portion 162 that is parallel with the first axis 154, and linear movement (represented by arrows 164) of the actuator portion 162 along a length of the sensor housing 156, so that a significant increase in measurement range and resolution can be realized when compared to the prior art without significantly increasing the size of the sensor assembly or the need to enlarge the size of the hole 146 of the container 144 for installation of an otherwise larger sensor assembly.

Referring now to FIGS. 12-16 and 20, the sensor assembly 150 preferably includes the sensor housing 156 with a first housing section 170 that is preferably integrally formed with the mounting head 148 and a second housing section 172 that extends from the first housing section 170. The first and second housing sections 170, 172 are preferably constructed of a plastic material that is chemically resistant to the liquid being measured, but may be constructed of any suitable material or combinations of materials including, but not limited to, metals, ceramics, composites, and so on. As in the previous embodiment, although the housing 156 is shown having a fixed length or "depth" into the tank, it will be understood that the housing 156 can be adjustable in length and/or distance with respect to the mounting head to accommodate a wide variety of tank configurations and sizes.

A first pivot mount 174 is integrally formed or otherwise connected to the second housing section 172 and is in the form of an elongate, tubular member that extends transverse to a sensor wall 175 of the first housing section 170 when connected thereto and coaxial with the first pivot axis 154. The sensor wall 175 extends between the movable actuator portion 162 and the electronic sensor unit 52 (FIGS. 10 and 11) located within the hollow interior of the first housing section 170. A pivot pin 176 extends through a bore 178 (FIG. 20) of the first pivot mount 174 and is pivotally secured thereto via a push nut or washer (not shown) that press-fits over one end of the pivot pin 176 after being inserted into the bore 178 of the first pivot mount 174, as in the previous embodiment. It will be understood that the push-nut or washer can be eliminated and other means used for pivotally securing the first pivot pin 176 to the first pivot mount 174 can be used.

A transverse opening 180 (FIG. 20) is formed in the pivot pin 176 and is sized to slidably receive a proximal or connection end 182 of the float rod 166 so that the float can slide through the pivot pin 176 and rotate about the first pivot axis 154 with the pivot pin 176 during movement of the float, such as when the level of liquid within the container changes.

The connection end 182 of the float rod 166 is also slidably connected to the actuator portion 162 for pivoting and sliding movement therewith. A distal or float end 184 of the float rod 166 receives the float 168. The float 168 is connected to the distal end 184 of the float rod 166 via a central bore 186 (FIG. 20) formed in the float in a conventional manner, with push-nuts or washers 188 pressed onto the distal end 184 of the float rod 166 on either side of the float 168. As with the previous embodiment, the float rod 166 can be bent to accommodate the float rod mounting and configuration of a particular tank or container. However, it will be understood that the float rod can be straight or configured in any desired shape to accommodate different containers and liquid level measurement configurations. It will be further understood that the float 168 is not limited to the cylindrical shape as shown, but may encompass any shapes or configuration without departing from the spirit and scope of the invention.

As in the previous embodiment, the first housing section 170 of the present embodiment is preferably of unitary construction with the mounting head 148 so that a hollow interior (not shown) of the first housing section 170 is isolated from the liquid in the tank or container being measured. However, it will be understood that the mounting head 148 and first housing section 170 can be separately formed, connected, and sealed together without departing from the spirit and scope of the invention. An electronic sensor unit 52 (FIG. 20), including one or more sensing and processing circuit board(s) 54, one or more sensors 56 (FIG. 10), and/or one or more sensors 58 (shown in phantom line in FIG. 10), as well as suitable processing circuitry (not shown) are located in the hollow interior of the first housing section 170 and are also isolated from the contents of the tank.

As best shown in FIG. 20, the first housing section 170 tapers inwardly and away from the mounting head 148 and is received in a similarly shaped hollow interior 190 of the second housing section 172. Due to the unitary construction of the housing section 170 with the mounting head 148, the hollow interior (not shown) of the first housing section 170 and its contents, including the electronic sensor unit 52, are completely isolated from the liquid being measured. This feature advantageously increases the measurement reliability of the transducer 140 and extend its useful life over prior art arrangements where measurement components are directly exposed to the liquid being measured. Since many liquids are corrosive in nature and could cause deterioration of the measurement components and their electrical connections in prior art solutions, isolation of the sensor unit 52 in accordance with the present invention prevents deterioration of both the measurement components as well as their electrical connections, thereby providing a liquid level transducer 140 that is more robust, reliable, and longer lasting than prior art solutions. The sensor unit 52 in the present embodiment is substantially similar in construction to the sensor unit in the previous embodiment, and therefore will not be further described, with the exception that instead of a three-wire system associated with the liquid level transducer 10, which can be used for power, ground and liquid level signal associated with active electronic components on the PCB for converting the sensor output to a voltage for operating an indicator or the like, the transducer 140 of the present embodiment comprises two wires 171 and 173 for powering one or more passive devices, such as parallel reed switches each in series with a resistor for changing the voltage as more or less reed switches are activated in response to a change in liquid level and the corresponding change in linear position of the actuator portion 162 with respect to the housing 150 and the passive electronics positioned therein.

Figure 15:
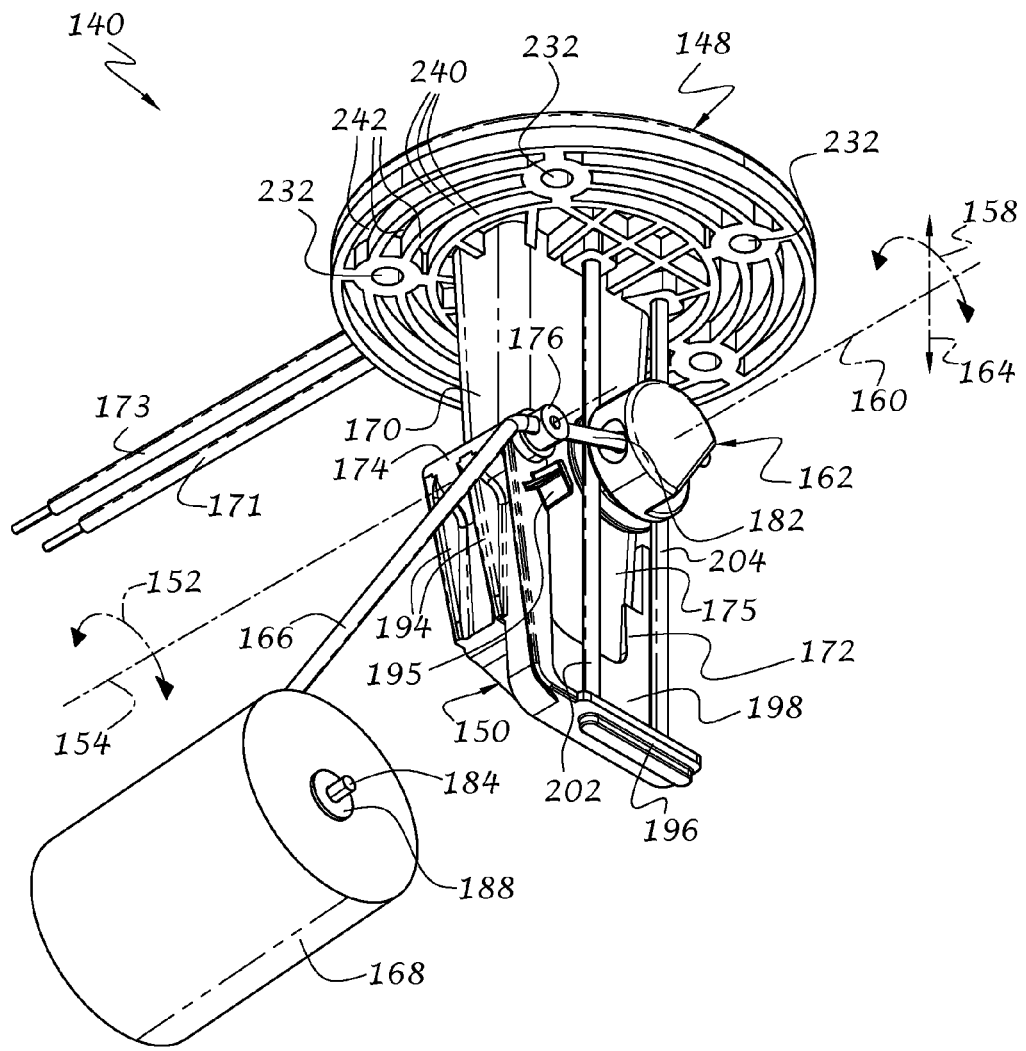
FIG. 15 is a right-front bottom isometric view thereof with the pivoting float and actuator portion in the second or intermediate position with respect to the mounting head.
Figure 16:
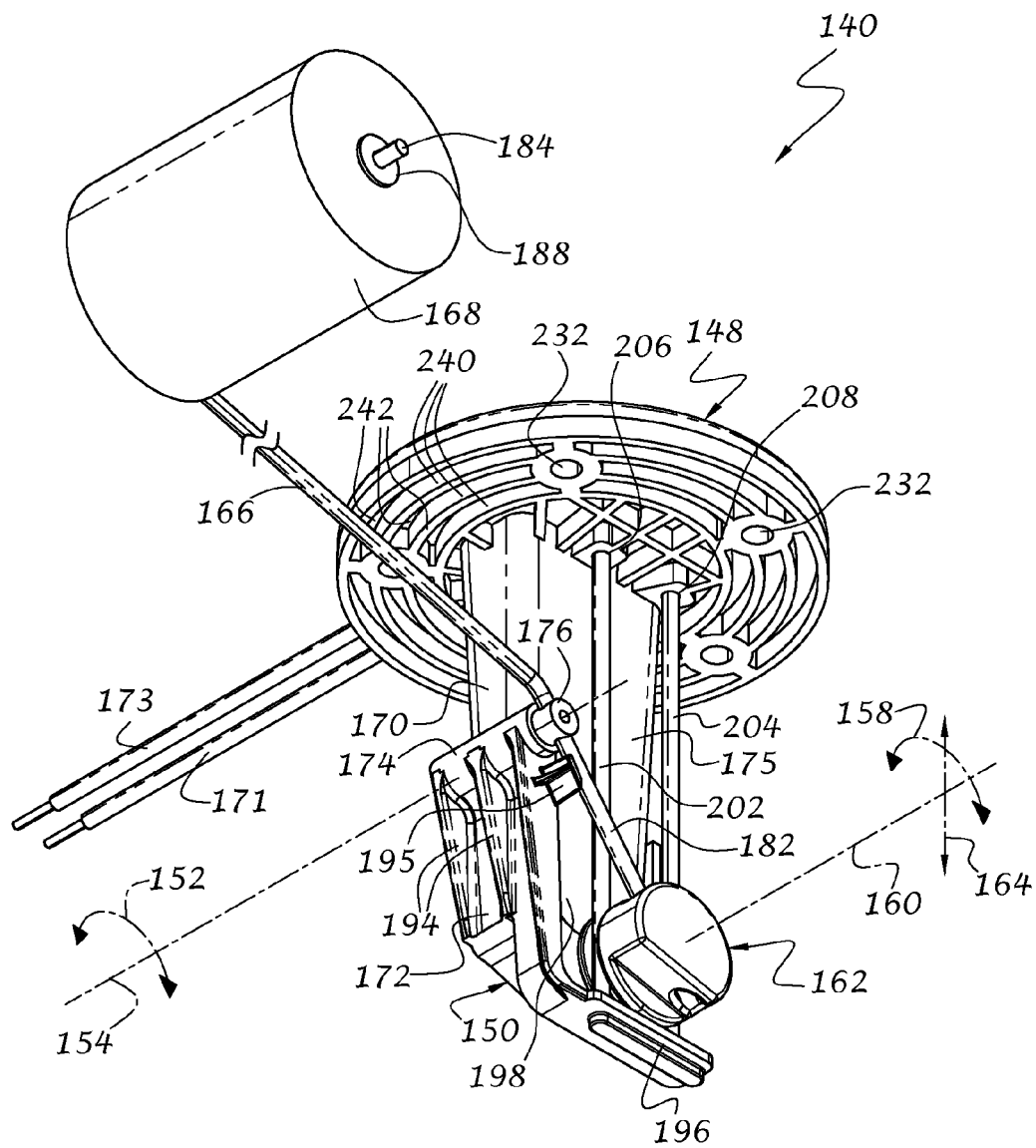
FIG. 16 is a view similar to FIG. 15 with the pivoting float and actuator portion in a third or distal position with respect to the mounting head.
Figure 22:
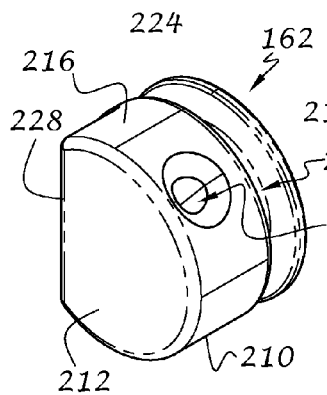
FIG. 22 is a right-front top isometric view of a further exemplary embodiment of an actuator portion in accordance with the invention.
Figure 23:
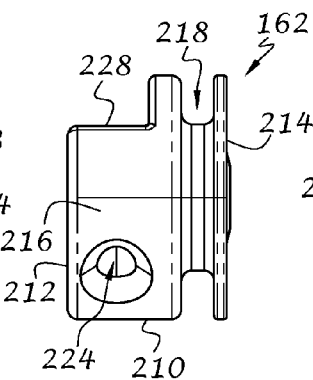
FIG. 23 is a right side elevational view thereof.
Figure 24:
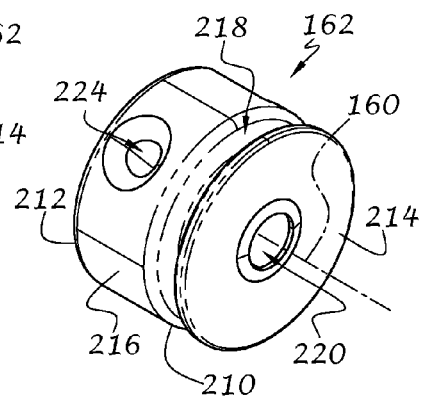
FIG. 24 is a right-rear top isometric view thereof.
Figure 25:
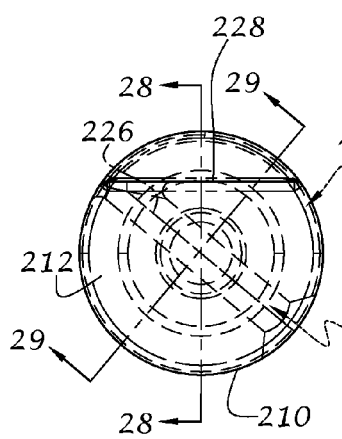
FIG. 25 is a top plan view thereof with underlying geometric features shown in hidden line.
Figure 26:
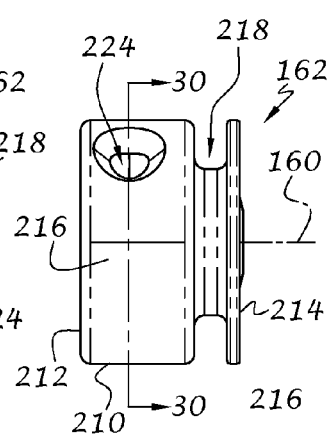
FIG. 26 is a left side elevational view thereof.
Figure 27:
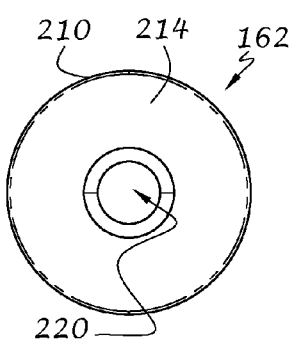
FIG. 27 is a bottom plan view thereof.
Figure 28:
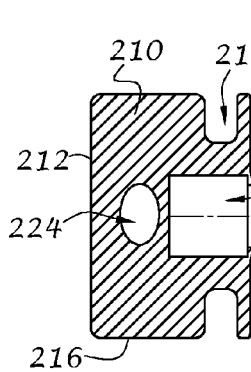
FIG. 28 is a sectional view thereof taken along line 28-28 of FIG. 25.
Figure 29:
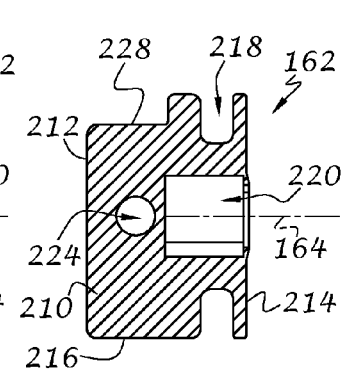
FIG. 29 is a sectional view thereof taken along line 29-29 of FIG. 25.
Figure 30:
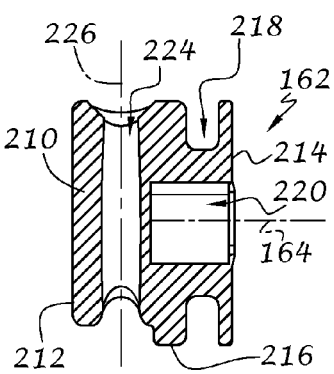
FIG. 30 is a sectional view thereof taken along line 30-30 of FIG. 26.

In order to secure the first and second housing sections together, and with particular reference to FIG. 21, a reinforced opening 191 is formed in a bottom wall 193 of the second housing section 172 and a complementary-shaped protrusion 195 formed on a bottom wall 197 of the first housing section 172. When the first housing section 170 is inserted into the second housing section 172, the protrusion 195 will extend through the opening 191 and downwardly from the bottom wall 193 of the second housing section 172. A locking cap 199 is then inserted over the protrusion 195 to prevent the protrusion from exiting the reinforced opening 191, thereby securing the housing sections together. It will be understood that other means for securing the housing sections together can be used without departing from the spirit and scope of the invention, including but not limited to, adhesive bonding, staking, mechanical clamping or fastening, ultrasonic welding, and so on. Moreover, in accordance with a further embodiment of the invention, the second housing section 172 can be eliminated and the described features, such as the first pivot mount 174 and ledge 196, can be formed on or otherwise connected to the first housing section 170. As best shown in FIGS. 15 and 16, a stop 195 is formed on the second housing section 172 to limit rotational movement of the float arm 166, and thus the linear travel of the actuator portion 162 when the container approaches an empty condition.

Reinforcing ribs 194 (FIGS. 12, 15, 16, and 21) can be formed on the second housing section 172. A lower support ledge or platform 196 extends outwardly from a side 198 of the second housing section 172. Lower rod support apertures or depressions 200 (FIG. 12) are formed in the lower platform 196 for receiving and supporting guide members, shown by way of example as cylindrical guide rods or rails 202 and 204.

The guide members 202, 204 preferably extend between the lower platform 196 of the second housing section 172 and the mounting head 148 and are secured therebetween when the second housing section 172 is connected to the first housing section 170 during assembly, as described above. Upper rod support apertures or depressions 206, 208, as best shown in FIG. 20, are formed in the mounting head 148 for receiving the guide members 202, 204, respectively. The guide rods are preferably cylindrical in shape and are operable to guide linear movement of the actuator portion 162 during use. Although two guide rods are shown, it will be understood that a single guide rod, or more than two guide rods, may be provided without departing from the spirit and scope of the invention. Moreover, in accordance with a further embodiment of the invention, one or more guide rods or rails can be formed integrally with the housing 150 and/or the mounting head 148. The guide rods can also be of any suitable cross sectional shape, such as T-shaped, L-shaped, oval, square, rectangular, triangular, dovetail-shaped, and so on.

Turning now to FIGS. 12 and 22-30, the actuator portion 162 preferably includes a generally cylindrical bearing body 210 with a front surface 212, rear surface 214, and a circular side surface 216 having the central or second pivot axis 160 (as previously described) extending between the front and rear surfaces. An annular guide groove or raceway 218 is formed in the side surface 216 and is shaped and sized for receiving the guide rods 202, 204 (FIGS. 12 and 20) of the transducer 140. The annular groove 218 functions as both a second pivot mount for the actuator portion 162 and the float rod 166 and float 168 and as a linear slide for linear movement of the actuator portion 162 along the guide rods 202, 204 during movement of the float 168 and float rod 166. Preferably, the annular groove 218 is formed proximal to the rear surface 214 and is coaxial with the second pivot axis 160. An actuator bore 220 is formed in the rear surface 214 of the actuator portion 162 and extends into the body 210 coincident with the second pivot axis 160.

As shown in FIG. 20, an actuator 222 is received in the actuator bore 220 and is fixed to the body 210 within the bore 220 so that the actuator 222 moves in a linear direction (denoted by arrows 154 in FIGS. 12-19) while rotating in a clockwise or counterclockwise direction (denoted by arrows 158 in FIGS. 12-19). When one or more sensors responsive to the presence of a magnetic field are used, such as one or more solid state magnetic flux field sensors, Hall effect sensors, magnetoresistive (MR) sensors, anisotropic MR (AMR) sensors, giant magnetoresistance (GMR) sensors, solid state Micro-Electro-Mechanical Systems (MEMS), magnetic switches such as reed switches, and so on, the actuator 222 is preferably in the form of a magnet with sufficient strength to create a difference in measurement in at least one of the afore-mentioned sensors during movement of the actuator portion 162 in response to changes in liquid level within the container.

Although the preferred embodiment utilizes a centrally-located and cylindrically-shaped magnet for the actuator 222, it will be understood that the actuator may be offset from the second pivot axis 160 and may be of any shape or configuration without departing from the spirit and scope of the invention. Moreover, as mentioned earlier, other non-contact sensors and actuators can be used without departing from the spirit and scope of the invention, such as proximity detectors using capacitance, optical, or other measurement technologies, and so on.

The actuator portion 162 also includes a guide bore 224 formed in the body 210 that extends through the side surface 216 for receiving the proximal or connection end 182 of the float rod 166 so that the float can slide within the bore 224 of the actuator portion 162 and rotate therewith about the second pivot axis 160 during movement of the float, such as when the level of liquid within the container rises or falls. The guide bore 224 has a central axis 226 (FIGS. 25 and 30) oriented perpendicular to the second pivot axis 160. The guide bore 224 is also axially offset from the annular guide groove 218 while extending through the center of the body 210, as best shown in hidden line in FIG. 25. In this manner, sliding and pivotal movement of the proximal end 182 of the float rod 166 is centered at the second pivot axis 160. A step 228 can formed in the front surface 212 of the actuator portion 162 for reducing the weight of the actuator portion.

It will be understood that the guide bore 224 may include linear guide bearings, low friction coatings, or the like to ensure smooth movement between the float rod 166 and the actuator portion 162. Preferably, the actuator portion 162 is constructed of a single piece of material with bearing or lubricating properties, such as, but not limited to, nylon, acetal, Teflon™, brass, and so on, in order to ensure smooth angular and linear sliding movement of the actuator portion 162 with respect to the guide rods 202 and 204, as well as smooth sliding movement with respect to the float rod 166. It will be further understood that where the guide rods and/or the float rod have a particular cross-section, the guide groove 218 and/or guide bore 224 can also be complementary in cross sectional shape or of a cross sectional shape that would be suitable for relative angular and/or linear movement of the components. Thus, a wide variety of different guide rod, float rod, and guide groove and guide bore configurations are within the purview of the present invention.

Figure 12:
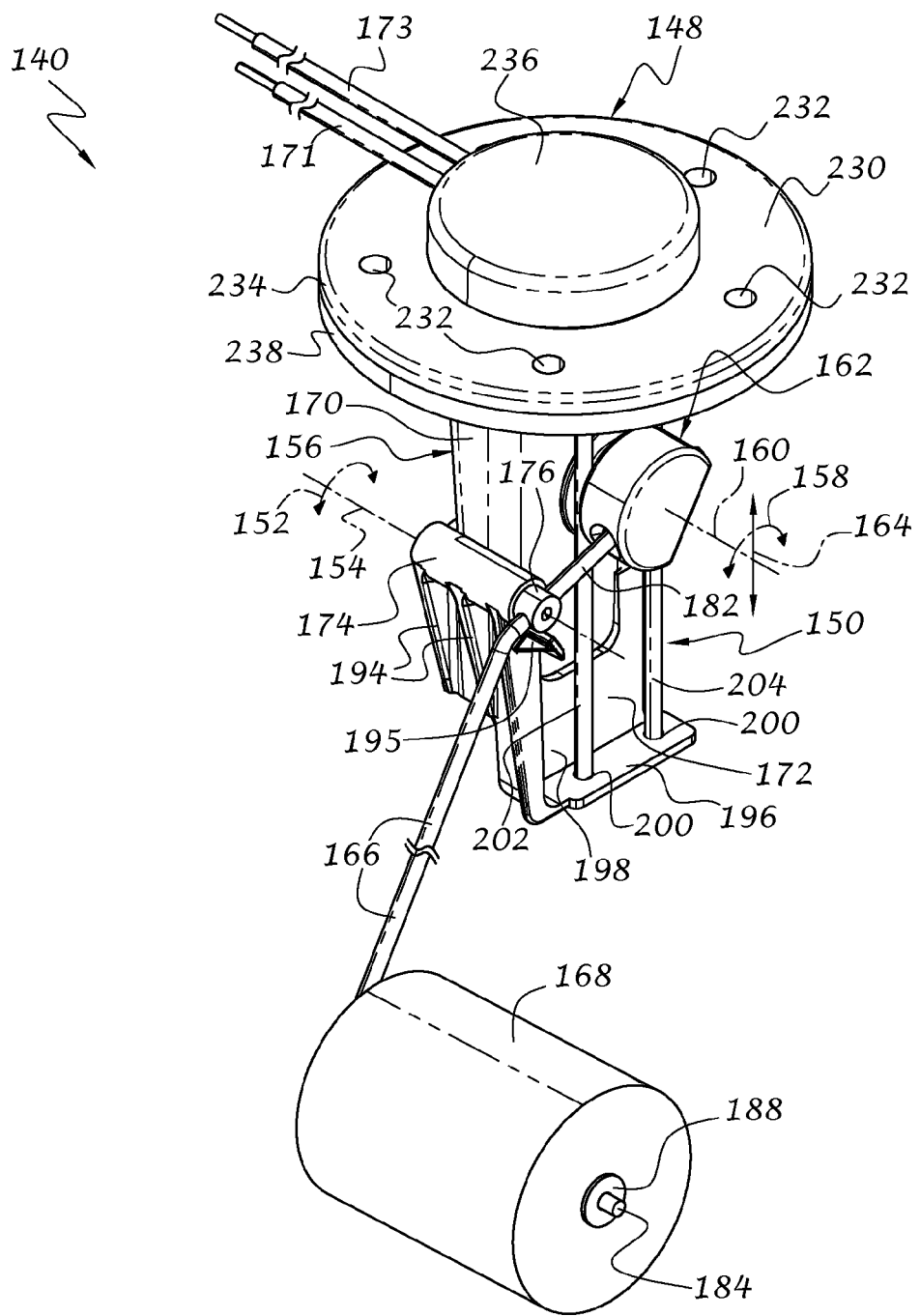
FIG. 12 is a right-front top isometric view of a liquid level transducer in accordance a further exemplary embodiment of the invention with the pivoting float and actuator portion in a first or proximal position with respect to a mounting head that forms part of the liquid level transducer.
Figure 13:
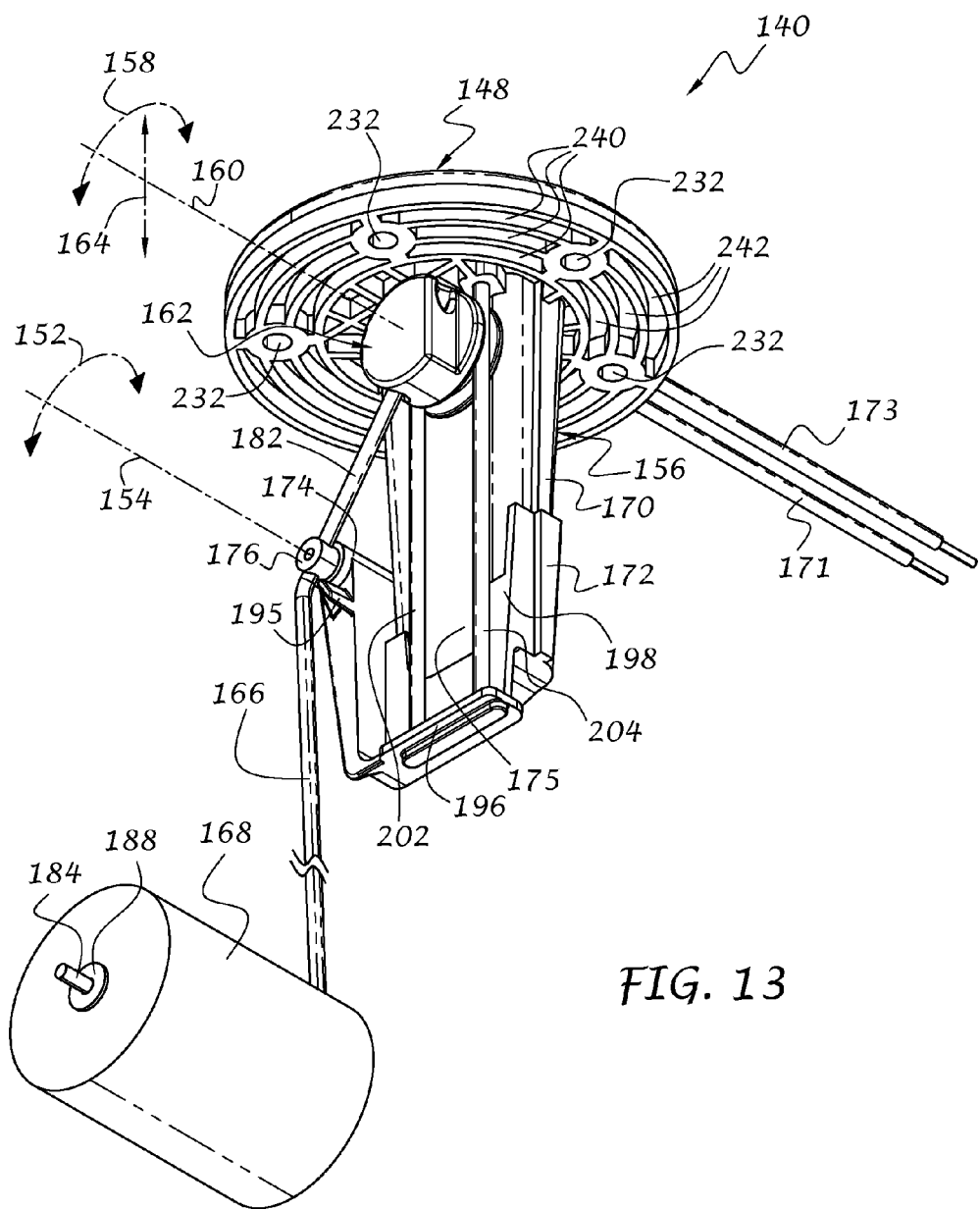
FIG. 13 is a right-rear bottom isometric view thereof.
Figure 14:
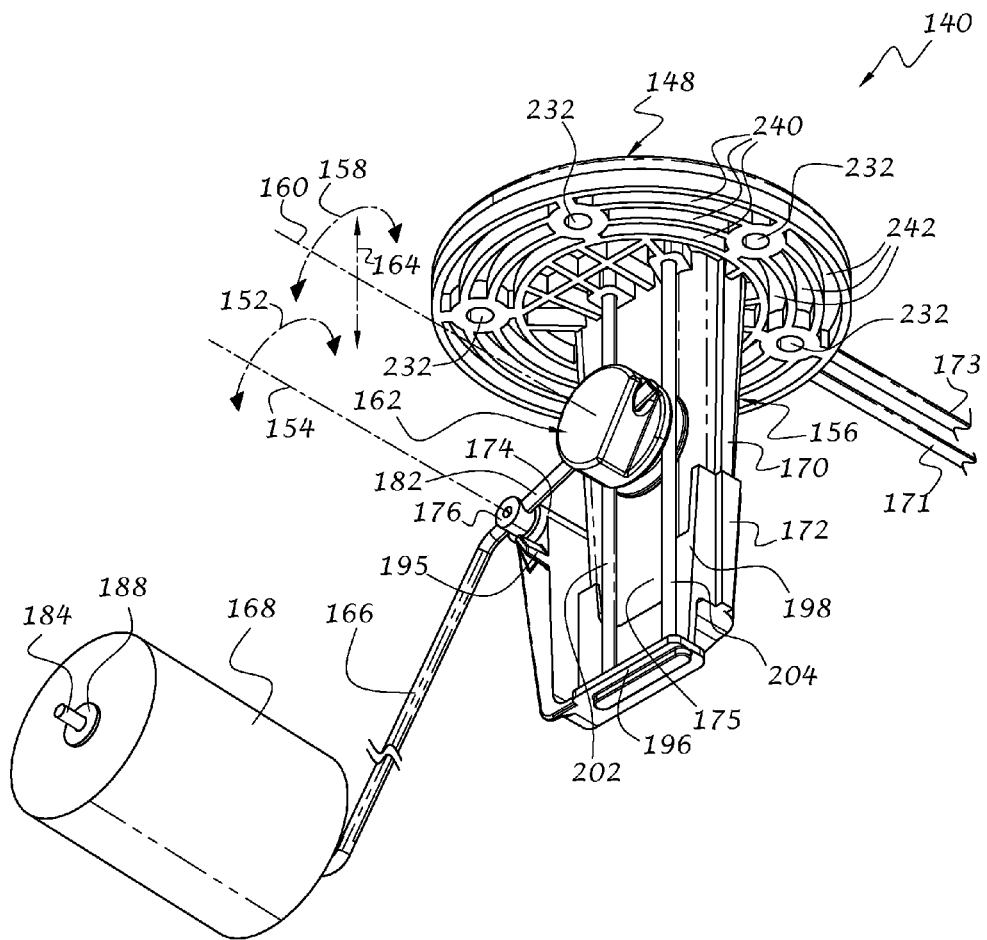
FIG. 14 is a view similar to FIG. 13 with the pivoting float and actuator portion in a second or intermediate position with respect to the mounting head.

Referring to FIGS. 12 and 20, the mounting head 148 is similar in construction to the mounting head 148 previously described, and includes a mounting flange 230 integrally formed with the first housing section 170 and extending radially outwardly therefrom. The mounting head 148 is preferably formed as a unitary structure with the first housing section 170 through injection molding, but may alternatively be formed by machining, die-casting, or other known forming means. The mounting flange 230 is preferably disk-shaped and includes a plurality of mounting holes 232 that extend axially through the mounting flange and in proximity to its outer peripheral edge 234. The mounting holes 232 are adapted to receive threaded studs (not shown) associated with a tank or other container in a well-known manner. A cover or cap 236 has an internal tabs 235 for mating with an annular groove (not shown) formed in the side wall (not shown) of the mounting head 148 in a snap-fit engagement to retain the cap 236 on the mounting head 148 and enclose the hollow interior of the first housing section 170, as previously described with respect to the mounting head 14 (FIG. 7). An annular gasket 238 (FIGS. 12 and 17-19) can be provided between the mounting flange 230 and the wall 142 of the container 144 for sealing the opening 146 (FIGS. 17-19) in the container through which the transducer 140 extends. Alternating ribs 240 and depressions 242 are formed in the bottom of the mounting head to reduce the weight and material costs, while maintaining sufficient strength and rigidity of the mounting head 148.

It will be understood that the mounting head 148 is not limited to a flange mounting arrangement as shown, other means for mounting the liquid level transducer 140 to a tank or other container can be used, including NPT type threads, clamping, welding, and so on, without departing from the spirit and scope of the invention.

The head 148 and housing sections 170, 172 are preferably constructed of a molded material, such as plastic, through injection molding or other techniques. However it will be understood that the mounting head 148 and/or the housing sections 170 and 172, are not limited to plastic material, but may be constructed of metal, composites, ceramics, combinations thereof; or any other suitable non-magnetic material. Moreover, although the first housing section 170 and second housing section 172 of the housing 150 are shown as separate units, they can be integrally formed.

Referring now to FIGS. 31-33, a liquid level transducer 250 in accordance with yet another embodiment of the invention is illustrated. The transducer 250 is substantially similar to the transducer 140 previously described, with the exception that the actuator portion 162 of the previous embodiment is replaced with an actuator portion 250 that functions in a similar manner. As illustrated in FIG. 31, the transducer 250 is oriented for mounting in a horizontal position, e.g. on a vertical wall of a container, tank or the like. Likewise in FIG. 32, the transducer 250 is oriented for mounting in a vertical position, e.g. on a horizontal wall of a container, tank or the like. Accordingly, it will be understood that the present invention is readily adaptable to any orientation where movement of the float can occur in response to a change in liquid level within the container.

With particular reference to FIG. 33, the actuator portion 252 preferably includes a generally cylindrical bearing body 254 with an annular wall 256 and an annular flange 258 extending radially outwardly from and around the periphery of the annular wall 256. A central opening 260 is formed by the annular wall 256 and extends through the body 254. The annular wall 256 forms a central axis 266, similar to the second axis of the previous embodiment, about which the actuator portion 252 will rotate during movement of the float 168 and float rod 166 (FIGS. 31 and 32). An actuator retainer 262 also includes an annular wall 264 with a central opening 268 for receiving an actuator 270, such as a magnet or the like, as previously described. The retainer 262 also includes an annular stop flange 272 that extends radially outwardly from and around the periphery of the annular wall 256. Holes 274 and 276 extend through the annular wall in a direction perpendicular to a central axis 280 of the annular wall 264. The holes 274 and 276 are configured for slidably receiving the proximal or connection end 182 of the float rod 166.

When assembled, the actuator 270 is fixedly connected within the bore 268 of the retainer 262 and the annular wall 264 of the retainer is received through the opening 260 of the bearing body 254. The annular flange 272 rests against the annular flange 258 and can be fixedly secured thereto. During assembly of the transducer 250, the actuator portion 252 is first placed on the sensor side wall 175 of the sensor housing 156, then the rods 202 and 204 are installed and secured in place, thereby trapping the flange 258 between the rods and the side wall of the housing. In this position, the annular wall 256 is located between and contacts the inner surfaces of the rods 202 and 204 during rotational and linear sliding movement in response to arcuate and sliding movement of the float rod and float, such as when the level of liquid in the container increases or decreases. The annular side wall 256 therefore functions as both a second pivot mount for the actuator portion 252 and the float rod 166 and float 168 and as a linear slide for linear movement of the actuator portion 252 along the guide rods 202, 204 during movement of the float 168 and float rod 166.

From the above-described configurations, it can be seen that various configurations can be implemented for achieving linear movement of the actuator in response to pivotal movement of the float, thereby increasing the travel distance of the actuator with respect to one or more sensors within the housing, over prior art solutions where the float and actuator move only along arcuate pathways. Accordingly, the present invention advantageously increases the size of the measurement area and the number of sensors and/or distance over which the sensor(s) can detect movement of the actuator, thereby increasing liquid level measurement accuracy while minimizing the size of the liquid level transducer.

It will be understood that the term "preferably" as used throughout the specification refers to one or more exemplary embodiments of the invention and therefore is not to be interpreted in any limiting sense. It will be further understood that the term "connect" and its derivatives refers to two or more parts capable of being attached together either directly or indirectly through one or more intermediate members. In addition, terms of orientation and/or position as may be used throughout the specification denote relative, rather than absolute orientations and/or positions.

It will be appreciated by those skilled in the art that changes could be made to the embodiments described above without departing from the broad inventive concept thereof.

By way of example, the first and second pivot mounts can be located on the first housing section rather than divided between the first and second housing sections. Moreover, as previously described, the second housing section can be eliminated and the structure and components of the liquid level transducer can be formed and installed on the first housing structure and/or the mounting head. In addition, the guide rods or rails can be located along the top, bottom, or any side or position and at various angles with respect to a direction the housing extends or is suspended in from the mounting flange. If the housing is circular or cylindrical in shape, the guide rods can be mounted at any location along the periphery or bottom of the housing. The guide rods may be retained by blind holes in the housing and end cap or may be retained by staking, push-nuts or other hardware for connecting the guide rods to the housing and and/or mounting head. Moreover, the guide members can be of any suitable cross sectional shape and formed separately from the housing as shown, or can be integrally formed with the housing. In addition, the guide members can be one or more integral tracks or slots formed in the housing with complementary structure on the actuator portion for sliding along the tracks or slots. The guide members Single guide members . . . can be integrally formed as round, Rails can be round rods or other shaped separate parts, single or multiple rails can be used.

In addition, the actuator portion can slide or rotate between, behind, in front of, and/or to the side of the guide members. The actuator portion may be of one-piece construction as in the second embodiment or in multiple parts as in the first and third embodiments. The actuator portion can also vary in size and shape, can partially or fully enclose the guide members or rods. The actuator portion can also be in the form of a wheel-shaped member or a double wheel-shaped member that encompasses opposite sides of the guide rods.

Moreover, the actuator, when embodied as a magnet, can be constructed of various materials, including ferrite, alnico, Samarian Cobalt or other magnetic material that is capable of generating a magnetic field, whether permanent or temporary. The magnet can be of various shapes and sizes, including cylindrical, disk, cube, rectangular, triangular, and so on. The magnet can also be positioned at various offsets to adjust the distance from the reed switches and/or other magnetic field sensors that may be required travel to actuate the sensor(s). The actuator may be retained in the actuator portion by push-nuts, staking, or rolling over material from the actuator body. The actuator can alternatively be insert-molded into the body of the actuator portion or epoxied into position for retention and protection from harmful liquids such as fuels that may be located within the container. The actuator can also be inserted from various directions and oriented at various positions to maximize the magnetic field towards the one or more sensors.

The body of the actuator portion can rotate about an axis perpendicular to the rails, and thus the PCB, as shown in the second and third embodiments, or can rotate about an axis parallel to the rails. The actuator portion can include an extension to allow the connection end of the float rod to be shorter. The actuator portion can also be counterbored to ensure the end of the float rod or rod extension slides freely through the body of the actuator portion. The float rod can also extend part way or completely through the guide bore of the actuator portion and can be constructed of any suitable configuration to ensure free pivoting and sliding movement throughout the range of empty to full conditions of the container. The actuator portion can also be integrally constructed with the actuator portion, such as through insert-molding or the like Furthermore, the hollow interior of the first housing section can be oriented horizontally, vertically, or at any other suitable angle to fit within the confines of the container and any surrounding structure associated with the vehicle or machine on which the container is mounted. The hollow interior can also include features to either center or offset the PCB with respect to the hollow interior to thereby accommodate the position or changing positions of the actuator. The hollow interior can also contain insulating fluid or potting material to protect the PCB and its associated sensors and other electronic components. Strain relief for the electrical wires can be provided by pins or bosses formed integrally with the hollow interior of the housing, or by separate hardware or wire wrapping or potting material. The end cap and housing can also be configured for aligning and retaining the end cap thereon through the use of one or more bosses that accept push-nuts, screws, and/or other retaining hardware.

It will be understood, therefore, that the invention is not limited to the particular embodiments disclosed, but is intended to cover all modifications and variations within the spirit and scope of the present invention as defined by the appended claims.

What is claimed is:

1. A transducer for determining the level of liquid within a container, the transducer comprising:
    a mounting head adapted for connection to the container;
    a housing extending from the mounting head and having a hollow interior isolated from liquid within the container;
    an actuator portion having:
        an actuator body connected to the housing, the actuator body being restrained to travel in a linear direction with respect to the housing; and
        an actuator connected to the actuator body for movement therewith;
    a first pivot axis operably associated with one of the housing and the actuator portion;
    at least one sensor located in the hollow interior, the at least one sensor changing an electrical state in response to external input from the actuator;
    at least one guide member connected to the housing and extending along the linear direction, wherein the actuator portion is slidably connected to the at least one guide member for movement therealong in the linear direction;
    a float rod having a proximal end operably associated with the actuator portion for movement therewith along the linear direction, the float rod being constrained to pivot about the first pivot axis, wherein the float rod is slidably connected to the actuator and pivotally connected to the housing such that arcuate movement of the float results in linear movement of the actuator portion; and
    a float connected to the float rod to thereby cause pivoting movement of the float rod about the first axis and linear movement of the actuator portion in response to a change in liquid level within the container to thereby change the electrical state of the at least one sensor proportional to the level of liquid within the container.

2. A transducer according to claim 1, wherein the housing comprises:
    a sensor wall positioned between the actuator portion and the at least one sensor.

3. A transducer according to claim 2, wherein the first and second pivot axes extend in a direction that is either parallel to the sensor wall or transverse to the sensor wall.

4. A transducer according to claim 2, and further comprising a second guide member connected to the housing and being parallel to the first guide member;
    wherein the actuator portion slides along the first and second guide members along the linear direction.

5. A transducer according to claim 4, wherein the first and second guide members comprise first and second guide rods spaced from the sensor wall.

6. A transducer according to claim 5, wherein the housing comprises a lower platform, and the first and second guide rods extend between the lower platform and the mounting head.

7. A transducer according to claim 6, wherein the actuator portion comprises an actuator body with first and second openings for slidably receiving the first and second guide rods, respectively.

8. A transducer according to claim 6, wherein the actuator portion comprises:
    an actuator body generally cylindrical in shape with a central axis coincident with one of the first and second pivot axes; and
    an annular groove formed in a side wall of the actuator body, the annular groove being in contact with the first and second guide rods to permit linear movement along the guide rods and rotational movement about the one pivot axis during arcuate movement of the float.

9. A transducer according to claim 8, wherein:
    the actuator comprises a magnet positioned in the actuator body for movement therewith; and
    the at least one sensor comprises a plurality of reed switches that change between open and closed electrical states in the presence or absence of a magnetic field generated by the magnet.

10. A transducer according to claim 6, wherein the actuator portion comprises:
    an actuator body having a first annular wall, a central opening defining a central axis coincident with one of the first and second pivot axes, and an annular flange surrounding the first annular wall;
    an actuator retainer having a second annular wall extending through the central opening of the actuator body, the actuator retainer having at least one transverse hole for receiving the proximal end of the float rod;
    wherein the annular flange of the actuator body is trapped between the sensor wall and the guide rods with the first annular wall extending between the guide rods for pivotal movement about the one pivot axis and slidable along the guide rods during arcuate movement of the float.

11. A transducer according to claim 1, wherein the housing comprises:
    a sensor wall positioned between the actuator portion and the at least one sensor.

12. A transducer according to claim 11, wherein the first pivot axis extends parallel to the sensor wall.

13. A transducer according to claim 11, wherein the first pivot axis extends transverse to the sensor wall.

14. A transducer according to claim 1, wherein the at least one guide member comprises first and second guide rods spaced from the sensor wall.

15. A transducer according to claim 14, wherein the housing comprises a lower platform, and the first and second guide rods extend between the lower platform and the mounting head.

16. A transducer according to claim 15, wherein the actuator portion comprises an actuator body with at least one surface for slidably receiving the first and second guide rods, respectively.

* * * * *